(12) United States Patent
Sato

(10) Patent No.: US 10,797,325 B2
(45) Date of Patent: Oct. 6, 2020

(54) FUEL CELL AND METHOD OF MANUFACTURING SAME

(71) Applicant: TOYOTA JIDOSHA KABUSHIKI KAISHA, Toyota-shi, Aichi-ken (JP)

(72) Inventor: Katsumi Sato, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 171 days.

(21) Appl. No.: 16/005,846

(22) Filed: Jun. 12, 2018

(65) Prior Publication Data
US 2018/0366744 A1    Dec. 20, 2018

(30) Foreign Application Priority Data

Jun. 15, 2017 (JP) .................. 2017-117306

(51) Int. Cl.

| | |
|---|---|
| *H01M 8/02* | (2016.01) |
| *H01M 8/0273* | (2016.01) |
| *H01M 8/10* | (2016.01) |
| *H01M 8/0297* | (2016.01) |
| *H01M 4/86* | (2006.01) |
| *H01M 8/0284* | (2016.01) |
| *H01M 8/0286* | (2016.01) |
| *H01M 8/1004* | (2016.01) |
| *H01M 8/1018* | (2016.01) |

(52) U.S. Cl.
CPC ......... *H01M 8/0273* (2013.01); *H01M 4/861* (2013.01); *H01M 4/8657* (2013.01); *H01M 8/0284* (2013.01); *H01M 8/0286* (2013.01); *H01M 8/0297* (2013.01); *H01M 8/1004* (2013.01); *H01M 2008/1095* (2013.01); *H01M 2250/20* (2013.01)

(58) Field of Classification Search
CPC ........ H01M 8/02; H01M 8/0273; H01M 8/10; H01M 8/1004
See application file for complete search history.

(56) References Cited

U.S. PATENT DOCUMENTS

| | | | | |
|---|---|---|---|---|
| 6,057,054 A | * | 5/2000 | Barton | H01M 8/0271 429/483 |
| 2016/0285119 A1 | * | 9/2016 | Hayashi | H01M 8/1004 |

FOREIGN PATENT DOCUMENTS

| | | |
|---|---|---|
| JP | 2015-115131 A | 6/2015 |
| JP | 2017-004607 A | 1/2017 |

* cited by examiner

*Primary Examiner* — Kenneth J Douyette
(74) *Attorney, Agent, or Firm* — Dickinson Wright PLLC

(57) ABSTRACT

A method of manufacturing a fuel cell including a membrane electrode assembly and a resin frame includes, in a membrane electrode assembly sheet that is used for acquiring the membrane electrode assembly, and in which a porous layer including at least a catalytic electrode layer is disposed on at least one surface of an electrolyte membrane, applying a sealing agent onto the porous layer in a region including a part forming an outer periphery of the membrane electrode assembly to seal a pore of the porous layer; acquiring a stack member including the membrane electrode assembly by cutting the membrane electrode assembly sheet in the region; and bonding the resin frame to a part of the porous layer in the stack member where the sealing agent is applied, using an adhesive.

2 Claims, 19 Drawing Sheets

FUEL CELL AND METHOD OF MANUFACTURING SAME

INCORPORATION BY REFERENCE

The disclosure of Japanese Patent Application No. 2017-117306 filed on Jun. 15, 2017 including the specification, drawings and abstract is incorporated herein by reference in its entirety.

BACKGROUND

1. Technical Field

The present disclosure relates to a fuel cell and a method of manufacturing the same.

2. Description of Related Art

In a fuel cell, an electrochemical reaction is caused by supplying different reactant gases to an anode and a cathode formed on different surfaces of an electrolyte membrane, and an electromotive force is acquired. Thus, in order to maintain sufficient electric power generation performance in the fuel cell, it is desirable to airtightly seal a channel of each reactant gas formed on both surfaces of the electrolyte membrane so that the reactant gases are not mixed with each other. As an example of a configuration for maintaining the sealability for the channels of the reactant gases disposed on the surfaces of the electrolyte membrane with the electrolyte membrane interposed therebetween, a configuration in which an exposed region where the electrolyte membrane is exposed without being covered with a catalytic electrode layer is provided in an outer peripheral portion of one surface of the electrolyte membrane and gas sealing is performed using an adhesive in the exposed region is known (for example, refer to Japanese Unexamined Patent Application Publication No. 2015-115131 (JP 2015-115131 A)).

FIG. 19 is a schematic sectional view illustrating a schematic sealing structure known in the related art. FIG. 19 illustrates the structure of an outer peripheral portion of a single cell constituting a fuel cell. The fuel cell in FIG. 19 includes a stack that is configured of an electrolyte membrane 11, an anode 12 and a cathode 13 respectively disposed on the surfaces of the electrolyte membrane 11, and a gas diffusion layer 14 and a gas diffusion layer 15 stacked on the outer side of the anode 12 and the cathode 13. The fuel cell further includes a resin frame 20 that is disposed to surround the outer periphery of the stack. An exposed region a where the cathode 13 is not formed is disposed in an outer peripheral portion of one surface (the surface on the cathode 13 side in FIG. 19) of the electrolyte membrane 11. In the fuel cell in FIG. 19, the electrolyte membrane 11 is joined to the resin frame 20 using an adhesive 122 in the exposed region a. In such a configuration, the electrolyte membrane 11 and the resin frame 20 can be joined together without a porous body such as the anode 12, the cathode 13, the gas diffusion layers 14, 15, and the like interposed therebetween. Thus, by joining the electrolyte membrane 11 and the resin frame 20 together so as to be sufficiently close to each other using the adhesive 122, it is possible to achieve a sufficient gas sealability between the channels of the reactant gases respectively disposed on the surfaces of the electrolyte membrane 11 in the outer peripheral portion of the electrolyte membrane 11.

SUMMARY

When the electrolyte membrane 11 and the resin frame 20 are bonded to each other as illustrated in FIG. 19, an exposed location that is not covered with the cathode 13 and the gas diffusion layer 15, or the adhesive 122 and the resin frame 20 is present in the exposed region a of the electrolyte membrane 11. The exposed location is denoted by arrow β in FIG. 19. When the fuel cell is used, the fuel cell is repeatedly subjected to an increase and a decrease in temperature, or an increase and a decrease in humidity, and the electrolyte membrane 11 swells and contracts repeatedly. Thus, stress is concentrated in the exposed location β, and the electrolyte membrane 11 is likely to be damaged. When the electrolyte membrane 11 is damaged, the gas sealability may deteriorate in the damaged part of the electrolyte membrane 11. Thus, it is desirable to provide a technology for maintaining a gas sealability in an outer peripheral portion of an electrolyte membrane and maintaining the gas sealability even when a fuel cell is used.

The embodiment of the disclosure can be implemented as follows.

A first aspect of the disclosure relates to a method of manufacturing a fuel cell including a membrane electrode assembly in which catalytic electrode layers are respectively formed on both surfaces of an electrolyte membrane, and a resin frame joined to an outer peripheral portion of the membrane electrode assembly. The method includes, in a membrane electrode assembly sheet that is used for acquiring the membrane electrode assembly and includes the electrolyte membrane and the catalytic electrode layers, and in which a porous layer including at least the catalytic electrode layer is disposed on at least one surface of the electrolyte membrane, applying a sealing agent onto the porous layer in a region including a part to be formed into an outer periphery of the membrane electrode assembly to seal a pore of the porous layer in the region; acquiring a stack member including the membrane electrode assembly by cutting the membrane electrode assembly sheet in the region; and joining a part of the porous layer in the stack member where the sealing agent is applied and the resin frame with an adhesive. The pore of the porous layer includes at least pore of the catalytic electrode layer. With the method according to the first aspect of the disclosure, it is possible to increase the reliability of gas sealing in a part where the stack member and the resin frame are bonded to each other in the outer peripheral portion of the membrane electrode assembly, that is, an outer peripheral portion of the electrolyte membrane. Even when the electrolyte membrane swells and contracts repeatedly as the fuel cell is used, the gas sealability can be maintained by suppressing damage to the electrolyte membrane.

In the method according to the first aspect of the disclosure, the fuel cell may further include gas diffusion layers respectively stacked on the catalytic electrode layers in the membrane electrode assembly. Each of the membrane electrode assembly sheet and the stack member may include the gas diffusion layer stacked on the catalytic electrode layer as the porous layer. When the pore of the porous layer is sealed by applying the sealing agent onto the porous layer in the region including the part to be formed into the outer periphery of the membrane electrode assembly, the pore of each of the catalytic electrode layer and the gas diffusion layer in the region may be sealed by applying the sealing agent. With the method according to the first aspect of the disclosure, it is possible to increase the reliability of gas sealing in the outer peripheral portion of the electrolyte membrane.

In the method according to the first aspect of the disclosure, when the pore of the porous layer is sealed by applying the sealing agent onto the porous layer in the region including the part to be formed into the outer periphery of the membrane electrode assembly, (i) a first sealing agent as the sealing agent to the membrane electrode assembly sheet may be applied to seal the pore of the catalytic electrode layer in the region; and (ii) then, a second sealing agent having a higher viscosity than the first sealing agent as the sealing agent may be applied onto the region where the first sealing agent is applied in the membrane electrode assembly sheet to seal the pore of the gas diffusion layer in the region. With the method according to the first aspect of the disclosure, since the viscosity of the first sealing agent is set to be lower than the viscosity of the second sealing agent, it is possible to increase the reliability of the operation of sealing the pore of the catalytic electrode layer by applying the first sealing agent onto the gas diffusion layer. Furthermore, since the viscosity of the second sealing agent is set to be higher than the viscosity of the first sealing agent, it is possible to suppress spreading of the second sealing agent in the gas diffusion layer beyond a desired range when the second sealing agent is applied to the membrane electrode assembly sheet. Thus, it is possible to suppress a situation where supply of a reactant gas to the catalytic electrode layer is impeded by a sealing portion at the time of generating electric power in the fuel cell.

In the method according to the first aspect of the disclosure, when the pore of the porous layer is sealed by applying the sealing agent onto the porous layer in the region including the part to be formed into the outer periphery of the membrane electrode assembly, the sealing agent may be applied to the porous layer using, as the membrane electrode assembly sheet, a membrane electrode assembly sheet in which the porous layer is disposed on both surfaces of the electrolyte membrane. With the method according to the first aspect of the disclosure, it is possible to increase the reliability of gas sealing in the outer peripheral portion of the electrolyte membrane.

A second aspect of the disclosure relates to a fuel cell that includes a membrane electrode assembly in which catalytic electrode layers are respectively formed on both surfaces of an electrolyte membrane, and a resin frame joined to an outer peripheral portion of the membrane electrode assembly. A porous layer that includes at least the catalytic electrode layer and has a pore in the outer peripheral portion in the porous layer is disposed on at least one surface of the electrolyte membrane, the pore being sealed with a sealing agent. The resin frame is bonded to the outer peripheral portion of the porous layer with an adhesive.

In the fuel cell according to the second aspect of the disclosure, the porous layer may include a gas diffusion layer stacked on the catalytic electrode layer. A pore of each of the catalytic electrode layer and the gas diffusion layer may be sealed in the outer peripheral portion of the porous layer with the sealing agent.

In the fuel cell according to the second aspect of the disclosure, the porous layer in which the pore in the outer peripheral portion is sealed with the sealing agent may be disposed on both surfaces of the electrolyte membrane.

The embodiment of the disclosure can also be implemented in various forms other than the method of manufacturing a fuel cell. The embodiment of the disclosure can be implemented in forms such as a fuel cell, a resin frame integrated membrane electrode assembly and a method of manufacturing the same, and a resin frame integrated membrane electrode gas diffusion layer assembly and a method of manufacturing the same.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

A-1 Overall Configuration of Fuel Cell

Figure 1:
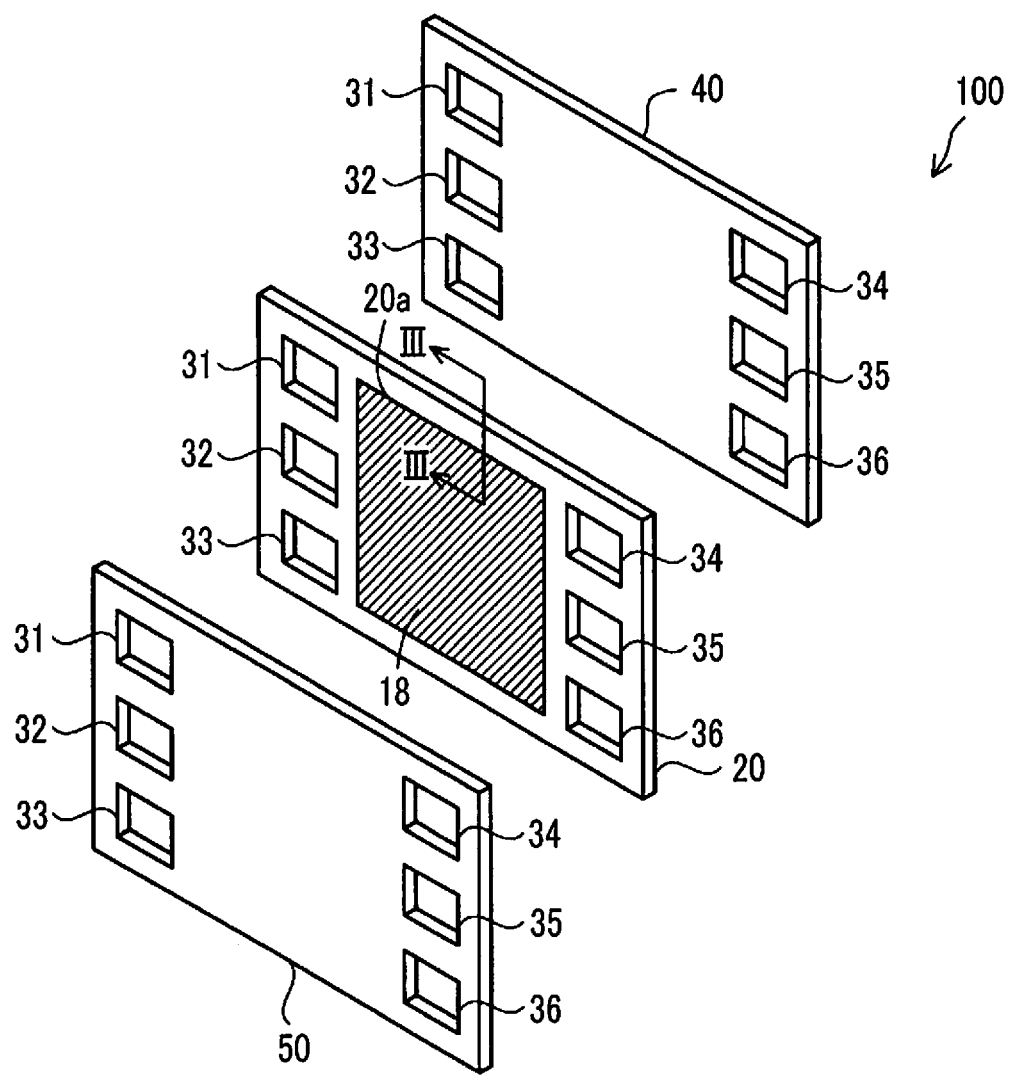
FIG. 1 is an exploded perspective view illustrating a schematic configuration of a fuel cell.
Figure 2:
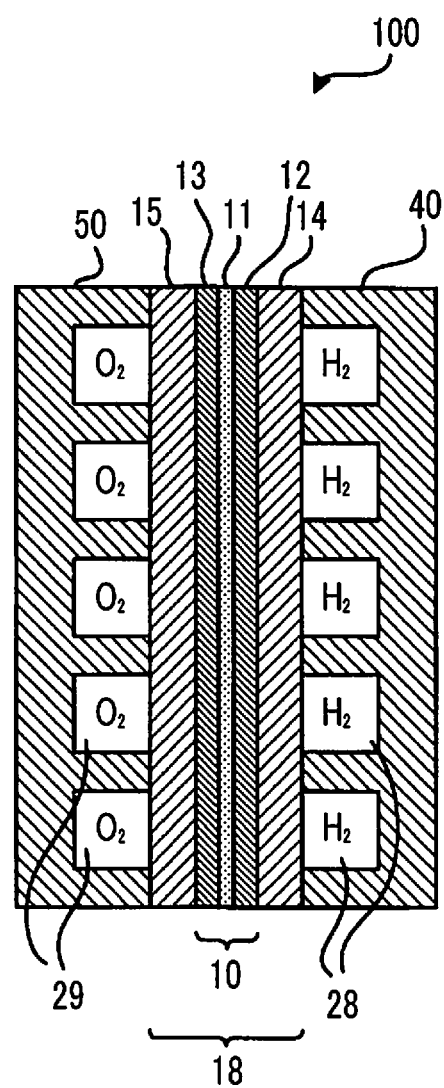
FIG. 2 is a schematic sectional view illustrating a schematic configuration of the fuel cell.

FIG. 1 is an exploded perspective view illustrating a schematic configuration of a fuel cell as a first embodiment of the disclosure. FIG. 2 is a schematic sectional view illustrating a schematic configuration of the fuel cell of the first embodiment. Hereinafter, an overall configuration of the fuel cell will be described based on FIG. 1 and FIG. 2. A configuration of a single fuel cell (single cell) 100 is illustrated in FIG. 1 and FIG. 2. The fuel cell of the first embodiment is formed as a stack structure by stacking a plurality of single fuel cells 100. In the specification, either of a single fuel cell or a fuel cell stack in which single fuel cells are stacked will be referred to as a fuel cell. While the fuel cell of the first embodiment is a solid polymer fuel cell, the fuel cell of the first embodiment can be other types of fuel cells such as a solid oxide fuel cell.

The single fuel cell 100 includes a membrane electrode assembly 10 (hereinafter, referred to as an MEA 10), gas diffusion layers 14, 15, gas separators 40, 50, and a resin frame 20. As illustrated in FIG. 2, the MEA 10 is configured of an electrolyte membrane 11, and an anode 12 and a cathode 13 that are catalytic electrode layers respectively formed on the surfaces of the electrolyte membrane 11. The MEA 10 is sandwiched between the gas diffusion layers 14, 15. The structure in which the gas diffusion layers 14, 15 are stacked on the MEA 10 is referred to as a membrane electrode gas diffusion layer assembly (MEGA) 18. The MEGA 18 is sandwiched between the gas separators 40, 50 on its both sides. The resin frame 20 is disposed between the gas separators 40, 50 and is joined to an outer peripheral portion of the MEA 10 (MEGA 18). The resin frame 20 is not illustrated in FIG. 2.

The electrolyte membrane 11 is formed of a polymer electrolyte material, for example, a proton-conducting ion exchange membrane formed of a fluorinated resin, and exhibits favorable proton conductivity in a wet state. Each of the anode 12 and the cathode 13 is a porous body having pores and is formed by coating conductive particles such as carbon particles with a polymer electrolyte having proton conductivity, the coating conductive particles carrying catalysts such as platinum or a platinum alloy. The polymer electrolyte included in the anode 12 and the cathode 13 may be the same type of polymer or a different type of polymer from the polymer electrolyte constituting the electrolyte membrane 11.

Each of the gas diffusion layers 14, 15 is formed of a member that has gas permeability and electron conductivity, and can be formed of a metal member such as a metal foam and a metal mesh, or a carbon member such as carbon cloth and carbon paper.

Each of the gas separators 40, 50 is formed of a gas-impermeable conductive member, for example, a carbon member such as gas-impermeable high-density carbon acquired by compressing carbon, or a metal member such as press-formed stainless steel. Channel grooves 28 in which reactant gases flow are on the surface, which faces the MEGA 18, of the gas separator 40, and channel grooves 29 in which reactant gases flow are formed on the surface, which faces the MEGA 18, of the gas separator 50. The channel grooves 28 on the surface of the gas separator 40 are not illustrated in FIG. 1. A porous body for forming an in-cell gas channel may be disposed between the gas separator 40 and the gas diffusion layer 14 and between the gas separator 50 and the gas diffusion layer 15. In such a case, the channel grooves 28, 29 may not be provided.

The resin frame 20 is formed into a frame shape using a thermoplastic resin. An opening portion 20a at the center of the resin frame 20 is a region where the MEA 10 (MEGA 18) is retained. For example, a resin selected from polypropylene (PP), a phenol resin, an epoxy resin, polyethylene terephthalate (PET), and polyethylene naphthalate (PEN) can be used as a material constituting the resin frame 20. The state of the part where the resin frame 20 and the MEA 10 (MEGA 18) are joined together will be described in detail later. The space between the resin frame 20 and the gas separators 40, 50 adjacent to the resin frame 20 is sealed by disposing, for example, a sealing member (not illustrated).

An inter-cell refrigerant channel (not illustrated) is also formed in the fuel cell. For example, such a refrigerant channel may be formed between all stacked single cells, or may be formed whenever a predetermined number of single cells are stacked.

Manifold holes 31 to 36 for forming manifolds are disposed near the outer periphery of each of the gas separators 40, 50 and the resin frame 20 such that the manifold holes 31 to 36 formed on one of the gas separators 40, 50 and the resin frame 20 respectively overlap the manifold holes 31 to 36 formed on the other of the gas separators 40, 50 and the resin frame 20 in a stack direction of members including the MEA 10 and the gas separators 40, 50 (the stack direction of the single fuel cell 100; simply referred to as a stack direction). That is, the manifold holes 31 to 36 form channels (gas manifolds) for supplying or discharging the reactant gases between cells, and channels (refrigerant manifolds) for supplying or discharging a refrigerant to the refrigerant channel, as channels passing through the gas separators 40, 50 and the resin frame 20.

A-2 Structure of Part where Resin Frame and MEA are Joined Together

Figure 3:
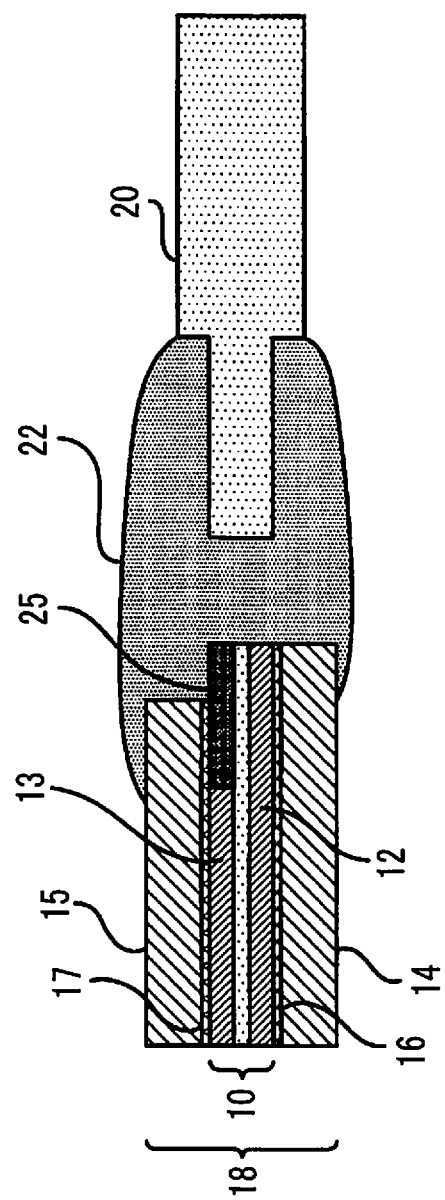
FIG. 3 is a schematic sectional view illustrating a state of a part where an MEGA and a resin frame are joined together.

FIG. 3 is a schematic sectional view illustrating the state of the part where the MEGA 18 and the resin frame 20 are joined together in the fuel cell of the first embodiment. The position of the section illustrated in FIG. 3 is illustrated as III-III section in FIG. 1. In the first embodiment, the part where the MEGA 18 and the resin frame 20 are joined together has the same structure as FIG. 3 on the entire outer periphery of the MEGA 18.

In the first embodiment, the MEGA 18 and the resin frame 20 are joined together through an adhesive portion 22 that is formed of an adhesive. For example, a photocurable adhesive, more specifically, an ultraviolet (UV) curable adhesive can be used as the adhesive constituting the adhesive portion 22. In the case of using a UV curable adhesive, when the MEGA 18 and the resin frame 20 are joined together, heating for curing the adhesive can be suppressed, and thus the exposure of the MEGA 18 to an undesirable high temperature can be suppressed. Thus, the UV curable adhesive is desirable. Specifically, as the UV curable adhesive, for example, a polyisobutylene (PIB) based adhesive or a silicone rubber based adhesive can be used. An adhesive that includes a thermoplastic resin or a thermosetting resin may also be used as the adhesive constituting the adhesive portion 22 as long as the degree of heating for curing the adhesive at the time of joining the MEGA 18 and the resin frame 20 together is within an allowed range.

In the first embodiment, a sealing portion 25 in which pores are sealed by a sealing agent is formed in an outer peripheral portion of the cathode 13 that is one of the catalytic electrode layers. That is, in the present embodiment, the cathode 13 is an example of a "porous layer" in "SUMMARY". While the catalytic electrode layer which is the porous layer is the cathode 13 in FIG. 3, the anode 12 may be the porous layer, and the sealing portion 25 may be disposed in the anode 12. The resin frame 20 is bonded to an outer peripheral portion of the catalytic electrode layer where the sealing portion 25 is disposed, using the adhesive (adhesive portion 22).

In the sealing portion 25, for example, a thermosetting resin can be used as the sealing agent used for sealing the pores of the cathode 13. From the viewpoint of suppressing heat applied to the MEGA 18 at the time of curing the sealing agent, it is desirable to use a sealing agent that is thermally cured at a low heating temperature. From the viewpoint of improving the productivity of the fuel cell, it is desirable to use a sealing agent that is quickly cured. The sealing agent after curing desirably has high flexibility. When the fuel cell is used, the fuel cell is repeatedly subjected to an increase and a decrease in temperature, or an increase and a decrease in humidity. Thus, the electrolyte membrane 11 swells and contracts repeatedly, and stress is applied to an end portion of the electrolyte membrane 11. At such a time, when the hardness of the sealing agent included in the sealing portion 25 disposed in an outer peripheral portion of the electrolyte membrane 11 is high, the outer peripheral portion of the electrolyte membrane 11 is likely to be damaged on its boundary with the sealing portion 25. Thus, from the viewpoint of suppressing damage to the electrolyte membrane 11 even when such stress is generated in the electrolyte membrane 11, it is desirable that the flexibility of the sealing agent after curing be high. From such a viewpoint, the sealing agent can be exemplified by polyisobutylene (PIB) or silicone rubber. From the viewpoint of increasing the adhesion between the sealing agent and the adhesive portion 22, it is desirable to use a resin from the same family as the resin included in the adhesive constituting the adhesive portion 22 (for example, both of the adhesive and the sealing agent include PIB, or both include silicone rubber). A thermoplastic resin may also be used as the sealing agent as long as the temperature applied to the MEA 10 at the time of curing the sealing agent is within an allowed range.

As illustrated in FIG. 3, in the MEGA 18 of the first embodiment, the outer periphery of the gas diffusion layer 15 on the cathode 13 side is separated from the outer periphery of the MEA 10 and is disposed closer to a center portion of the MEGA 18 than the outer periphery of the MEA 10. Thus, on the outer surface of the cathode 13 that is perpendicular to the stack direction, at least a part of the sealing portion 25 formed in the outer peripheral portion of the cathode 13 is exposed on the surface of the MEGA 18 without being covered with the gas diffusion layer 15. In the first embodiment, the gas sealability on the outer periphery of the MEGA 18 is maintained by joining the sealing portion 25 and the adhesive portion 22 together in the outer peripheral portion of the MEGA 18. A method of joining the resin frame 20 and the MEGA 18 together through the adhesive portion 22 and the sealing portion 25 will be described in detail later.

In the fuel cell of the first embodiment, microporous layers (MPL) 16, 17 are disposed on the surface of the gas diffusion layer 14 on the anode 12 side, and the surface of the gas diffusion layer 15 on the cathode 13 side, respectively. The MPLs 16, 17 can be formed by applying a paste including conductive particles such as carbon particles and a water-repellent resin such as polytetrafluoroethylene (PTFE) to the surface of each of the gas diffusion layers 14, 15. The MPLs 16, 17 have a function of protecting the catalytic electrode layers and the electrolyte membrane 11 and a function of guiding water generated along with electric power generation into the gas diffusion layers 14, 15 to discharge the water from the catalytic electrode layers by gradually increasing the porosity from the catalytic electrode layer side to the inside of each of the gas diffusion layers 14, 15. Since the MPLs 16, 17 are optional, the MPLs 16, 17 may not be disposed on the surfaces of the gas diffusion layers 14, 15 in the first embodiment and a second embodiment and subsequent embodiments described later.

A-3 Method of Manufacturing Fuel Cell

Figure 4:
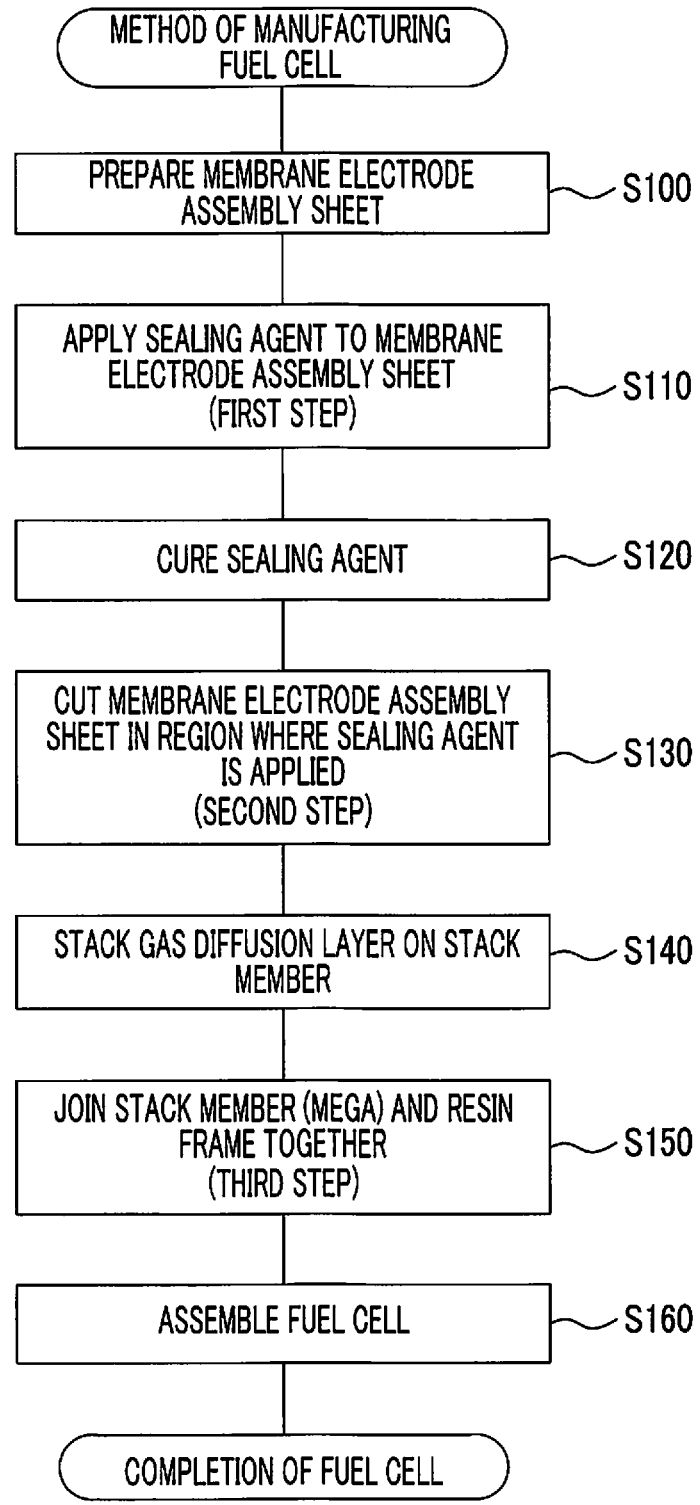
FIG. 4 is a flowchart illustrating a method of manufacturing the fuel cell.
Figure 5:
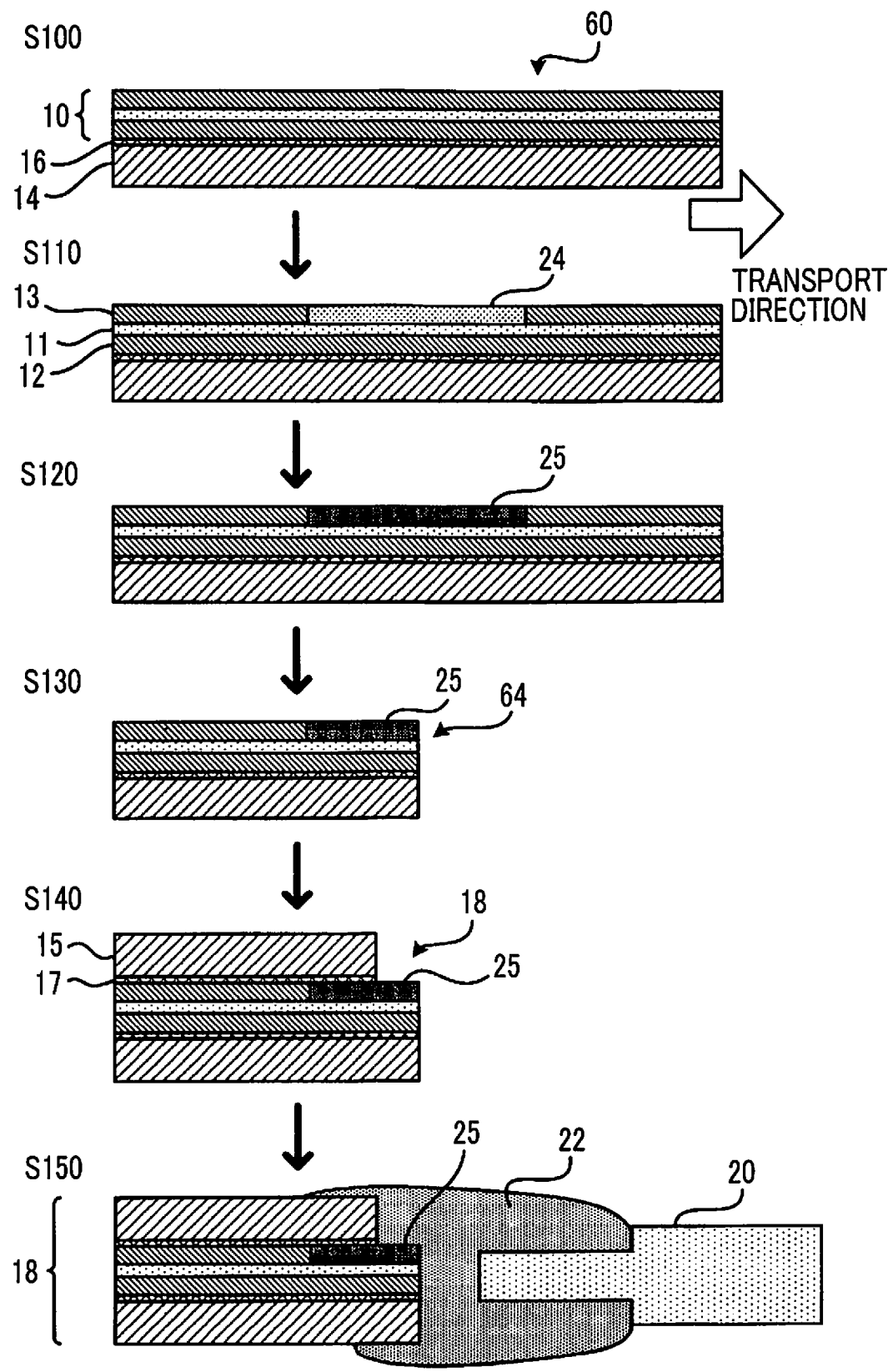
FIG. 5 is a schematic sectional view illustrating a state of each step in the middle of manufacturing the fuel cell.
Figure 6:
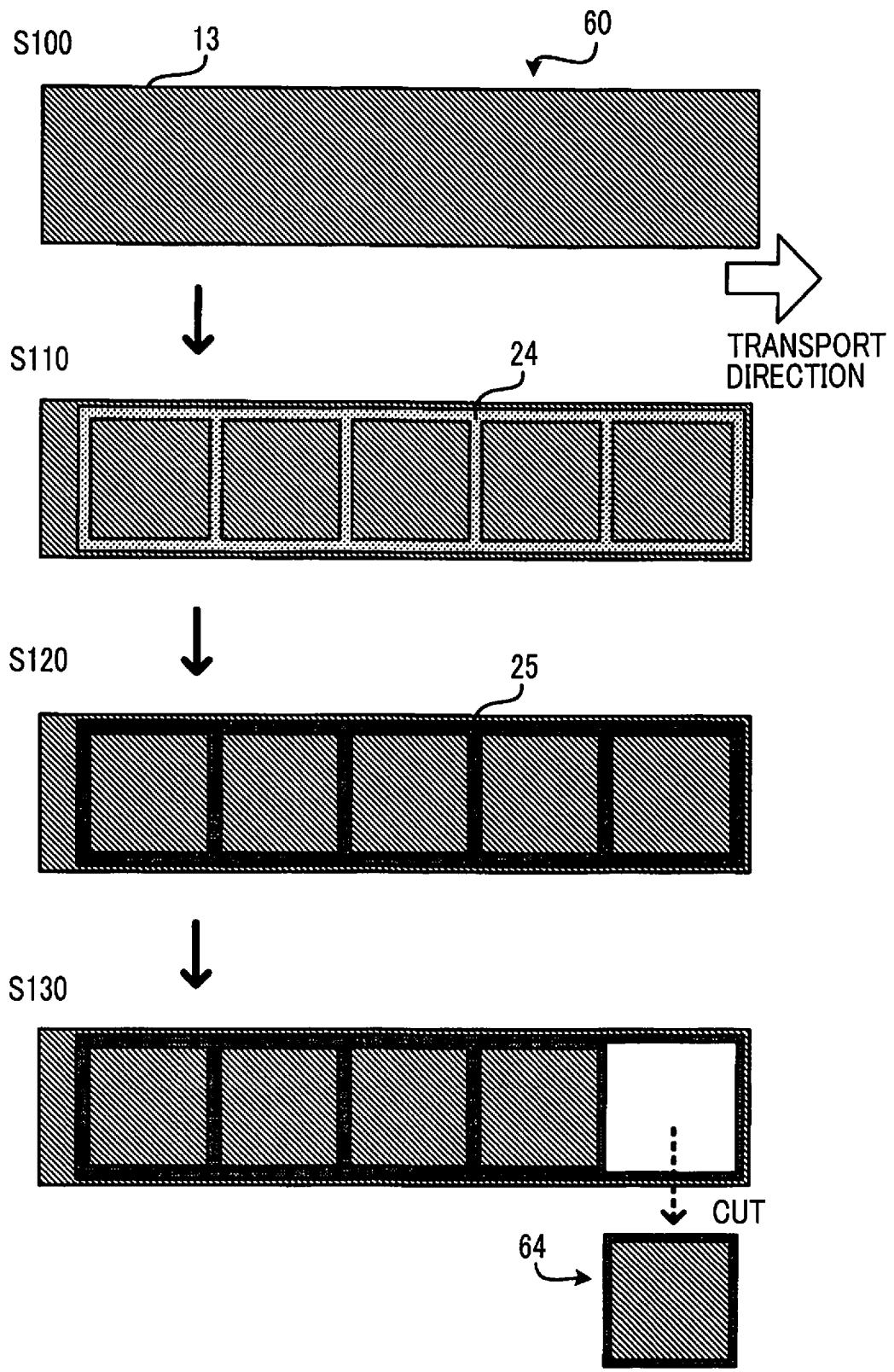
FIG. 6 is a plan view illustrating a state of each step in the middle of manufacturing the fuel cell.
Figure 7:
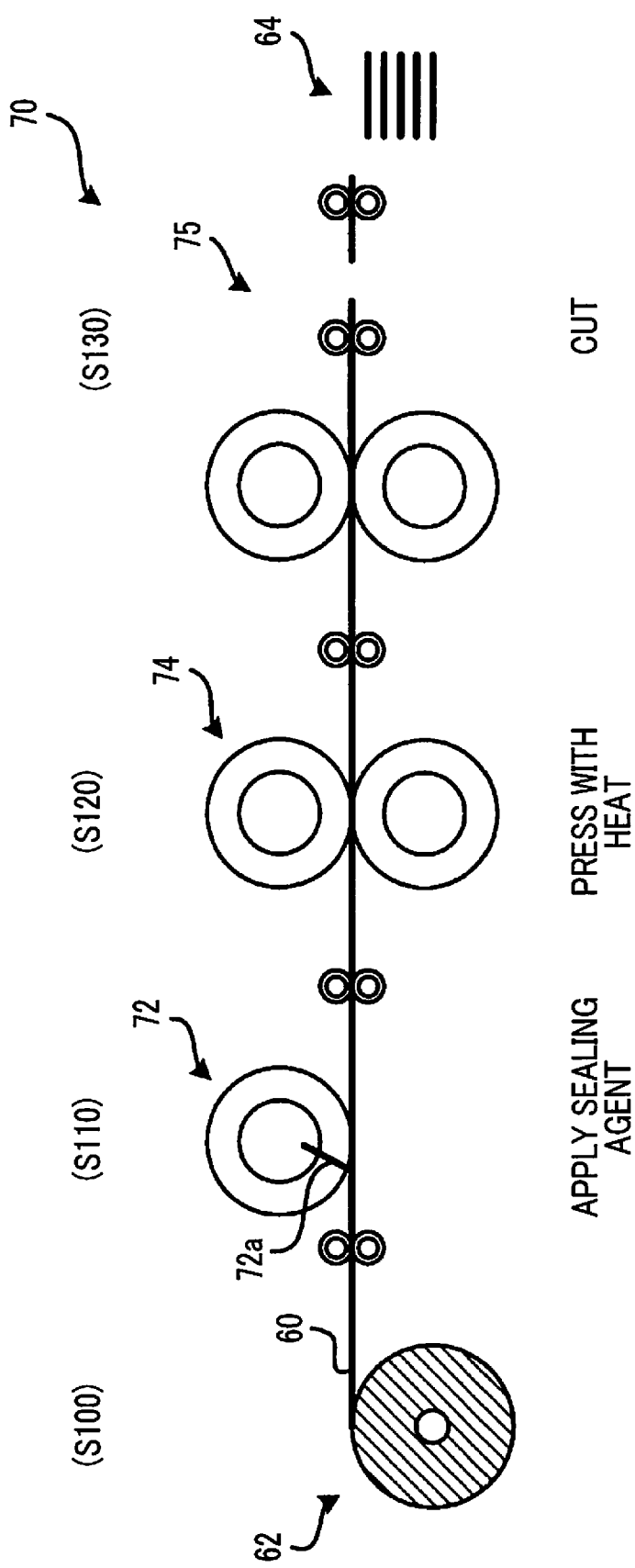
FIG. 7 is an explanatory diagram schematically illustrating a configuration of a manufacturing device.

FIG. 4 is a flowchart illustrating a method of manufacturing the fuel cell of the first embodiment. FIG. 5 is a schematic sectional view illustrating the state of each step in the middle of manufacturing when the fuel cell is manufactured using the method illustrated in FIG. 4. FIG. 6 is a plan view illustrating the state of each step in the middle of manufacturing the fuel cell. FIG. 7 is an explanatory diagram schematically illustrating a configuration of a manufacturing device 70 that executes step S100 to step S130 illustrated in FIG. 4. The manufacturing device 70 includes a sealing agent applying unit 72, a curing unit 74, and a cutting unit 75. As illustrated in FIG. 7, the manufacturing device 70 executes various processes in its units while continuously transporting a membrane electrode assembly sheet 60 in a roll-to-roll manner. The membrane electrode assembly sheet 60 is a band-shaped layer that includes the MEA 10. Hereinafter, the method of manufacturing the fuel cell will be described based on FIG. 4 to FIG. 7.

When the fuel cell is manufactured, first, the membrane electrode assembly sheet 60 is prepared (step S100). The membrane electrode assembly sheet 60 of the first embodiment includes the gas diffusion layer 14 in addition to the MEA 10, but does not include the gas diffusion layer 15 (refer to FIG. 5). In step S100, a membrane electrode assembly sheet roll 62 is prepared as the membrane electrode assembly sheet 60 (refer to FIG. 7). The membrane electrode assembly sheet roll 62 is acquired by winding, in a roll shape, the membrane electrode assembly sheet 60 in which a stack structure including the MEA 10 and the gas diffusion layer 14 is continuously formed in a band shape. The membrane electrode assembly sheet roll 62 is used for continuously acquiring a plurality of MEAs 10.

After step S100, in the sealing agent applying unit 72, the sealing agent is applied onto the cathode 13 included in the membrane electrode assembly sheet 60 (step S110). Step S110 is referred to as a first step. FIG. 6 illustrates the state of the membrane electrode assembly sheet 60 seen from the side of its surface where the cathode 13 is formed. In FIG. 5 and FIG. 6, a region of the cathode 13 where the sealing agent is applied in step S110 is illustrated as a sealing agent applying region 24.

The application of the sealing agent in step S110 is performed on a region including a part that forms the outer periphery of the MEA 10. The part forming the outer periphery of the MEA 10 is a part that forms the outer periphery of each MEA 10 when the MEAs 10 are acquired from the band-shaped membrane electrode assembly sheet 60. More specifically, the part forming the outer periphery of the MEA 10 is a part where the membrane electrode assembly sheet 60 is cut to acquire each MEA 10 when each MEA 10 is acquired by cutting the band-shaped membrane electrode assembly sheet 60. Accordingly, as illustrated in FIG. 6, a plurality of sealing agent applying regions 24 having a rectangular-frame shape is provided such that the sealing agent applying regions 24 are continuously formed in a transport direction of the membrane electrode assembly sheet 60 while the adjacent sealing agent applying regions 24 share one side.

As the sealing agent, the sealing agent described above can be used, and in step S110, the application of the sealing agent is performed in a state where the sealing agent has fluidity. Accordingly, the pores of the cathode 13 are sealed by the sealing agent in each sealing agent applying region 24 in the cathode 13.

In FIG. 7, in the sealing agent applying unit 72, the sealing agent is applied using a roll screen printing device that includes a roll-shaped screen and a squeegee 72a and performs printing using the sealing agent. However, the method of applying the sealing agent is not particularly limited as long as the sealing agent applying region 24 having a desired shape can be formed by the method. For example, as the method of applying the sealing agent, a method of using a roll coater, a method of using a typical screen printing device, a method of using a die coater, or a method of squeezing the sealing agent to a region where the sealing portion 25 needs to be disposed while the region is pressed with a mold can be used.

In the curing unit 74 of the manufacturing device 70, the sealing agent applied in step S110 is cured (step S120). The sealing agent applying region 24 forms the sealing portion 25 when the sealing agent is cured (refer to FIG. 5 and FIG.

6). As illustrated in FIG. 7, the manufacturing device 70 of the first embodiment cures the sealing agent in the curing unit 74 by pressing the membrane electrode assembly sheet 60 with heat.

After step S120, in the cutting unit 75 of the manufacturing device 70, the membrane electrode assembly sheet 60 is cut (step S130). The cutting of the membrane electrode assembly sheet 60 is performed at the region where the sealing agent is applied. Consequently, a stack member 64 that includes one MEA 10 corresponding to each fuel cell (single cell) is acquired (refer to FIG. 6 and FIG. 7). In the acquired stack member 64, the sealing portion 25 is formed in an outer peripheral part including the cut section (refer to S130 in FIG. 5). Step S130 is referred to as a second step.

After step S130, the gas diffusion layer 15 is stacked on the cathode 13 of each stack member 64 (step S140), and the MEGA 18 is acquired. In the first embodiment, each of the stack member 64 and the gas diffusion layer 15 has a rectangular shape in a plan view. The gas diffusion layer 15 is smaller than the stack member 64. When the gas diffusion layer 15 is stacked in step S140, the gas diffusion layer 15 is disposed such that its four outer peripheral sides are separated from the four outer peripheral sides of the stack member 64. Consequently, at least a part of the sealing portion 25 disposed in the outer peripheral portion of the cathode 13 is exposed on the outer surface of the acquired MEGA 18 (refer to FIG. 5).

After step S140, the MEGA 18 including the stack member 64 and the resin frame 20 are joined together (step S150). That is, an end portion of the MEGA 18 including the cut section is bonded to the resin frame 20 using the adhesive. Accordingly, the sealing portion 25 that is the part of the MEGA 18 where the sealing agent is applied is bonded to the resin frame 20. Step S150 is referred to as a third step.

As the adhesive, the adhesive described above can be used. The method of adhesion using the adhesive is not particularly limited as long as the MEGA 18 and the resin frame 20 are joined together by the method. For example, the adhesive can be disposed between the MEGA 18 and the resin frame 20 using a screen printing device. Alternatively, a mold may be used to dispose the outer peripheral portion of the MEGA 18 and an inner peripheral portion of the resin frame 20 in the mold, and the inside of the mold may be filled with the adhesive. Then, the adhesive may be cured. For example, UV radiation may be performed when an ultraviolet (UV) curable adhesive is used as the adhesive.

As described above, at least a part of the sealing portion 25 disposed in the outer peripheral portion of the cathode 13 is exposed in the MEGA 18. Thus, the adhesive portion 22 is bonded to the sealing portion 25 in the exposed part of the sealing portion 25, that is, on both the surface of the sealing portion 25 perpendicular to the stack direction and the surface of the sealing portion 25 parallel to the stack direction (the surface of the sealing portion 25 in its thickness direction) (refer to S150 in FIG. 5). Accordingly, the outer peripheral portion of the MEGA 18 is airtightly sealed between the MEGA 18 and the resin frame 20.

After step S150, the fuel cell is assembled using the MEGA 18 to which the resin frame 20 is joined (step S160), and the fuel cell is completed. Specifically, the single fuel cell 100 is assembled by stacking members including the MEGA 18 to which the resin frame 20 is joined, and the gas separators 40, 50, and a fuel cell stack is manufactured by stacking the single fuel cells 100.

In the fuel cell and the method of manufacturing the fuel cell of the first embodiment, when the MEGA 18 and the resin frame 20 are joined together, the resin frame 20 and the sealing portion 25 where pores are sealed in the cathode 13 are bonded to each other using the adhesive. Thus, a leakage of gas through the porous layer (cathode 13) is suppressed in the part where the sealing portion 25 and the resin frame 20 are bonded to each other, and the reliability of gas sealing can be improved. Consequently, it is possible to suppress mixing between gases on the anode side and the cathode side. The outer peripheral portion of the electrolyte membrane 11 is protected by being covered with the catalytic electrode layers including the sealing portion 25, and the adhesive portion 22 without a gap. Thus, even when stress is generated in the electrolyte membrane 11 due to repeated swelling and contraction of the electrolyte membrane 11 as the fuel cell is used, the gas sealability can be maintained by suppressing damage to the electrolyte membrane 11.

In the first embodiment, a plurality of stack members 64 is continuously manufactured while the membrane electrode assembly sheet 60 is continuously transported in a roll-to-roll manner. Thus, the efficiency of manufacturing the fuel cell can be improved. When the stack member 64 is manufactured as described above, in the first embodiment, the adjacent stack members 64 are separated from each other by cutting the membrane electrode assembly sheet 60 in the sealing portion 25. Accordingly, the occurrence of a region that is not used as each stack member 64 is suppressed in the membrane electrode assembly sheet 60, and the efficiency of using the material of the fuel cell can be increased. The cut location at the time of cutting in step S130, may not match the outer periphery of the MEGA 18. After cutting, the outer periphery of each stack member 64 may be trimmed.

B. Second Embodiment

Figure 8:
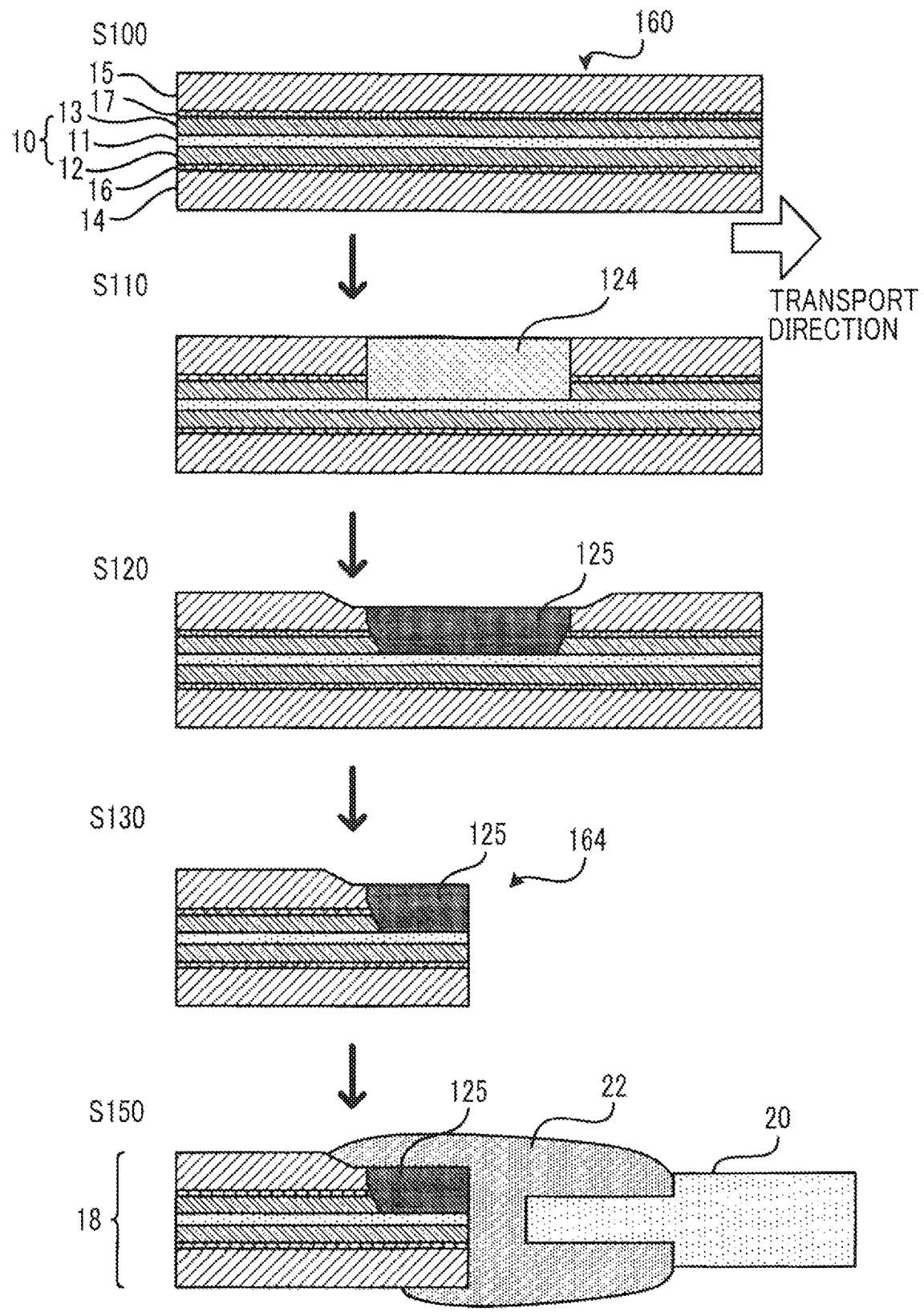
FIG. 8 is a schematic sectional view illustrating a state of each step in the middle of manufacturing a fuel cell.

FIG. 8 is a schematic sectional view illustrating the state of each step in the middle of manufacturing a fuel cell of a second embodiment in the same manner as FIG. 5. The fuel cell of the second embodiment has the same configuration as the fuel cell of the first embodiment. Thus, common parts in the first embodiment will be designated by the same reference signs and will not be described in detail. In a method of manufacturing the fuel cell of the second embodiment, common steps in the first embodiment will be designated by the same step numbers and will not be described in detail. In the second embodiment as well, the same manufacturing device as the manufacturing device 70 illustrated in FIG. 7 is used to continuously manufacture a plurality of stack members in a roll-to-roll manner as in the first embodiment.

When the fuel cell of the second embodiment is manufactured, first, a membrane electrode assembly sheet 160 is prepared (step S100). Unlike the first embodiment, the membrane electrode assembly sheet 160 of the second embodiment has a structure of MEGA in which not only the gas diffusion layer 14 but also the gas diffusion layer 15 are stacked (refer to S100 in FIG. 8).

The sealing agent is applied onto one of the gas diffusion layers (in the second embodiment, the gas diffusion layer 15) included in the membrane electrode assembly sheet 160 (step S110). The arrangement of the region where the sealing agent is applied is the same as the arrangement in the first embodiment illustrated in FIG. 6. Accordingly, pores included in the cathode 13 and the gas diffusion layer 15 are sealed using the sealing agent in a sealing agent applying region 124 that is a region where the sealing agent is applied in the cathode 13 and the gas diffusion layer 15. That is, the cathode 13 and the gas diffusion layer 15 in the second embodiment are examples of the "porous layer" in "SUMMARY". In step S110, the pores of the anode 12 and the gas diffusion layer 14 may be sealed by applying the sealing agent onto the gas diffusion layer 14 on the anode 12 side.

As the sealing agent, the same sealing agent as in the first embodiment can be used, and the sealing agent can be applied using the same method as in the first embodiment. In the second embodiment, the pores of both of the gas diffusion layer and the catalytic electrode layer need to be sealed by applying the sealing agent onto the gas diffusion layer. Thus, in step S110, the fluidity (viscosity) of the sealing agent may be adjusted such that the pores of both of the gas diffusion layer and the catalytic electrode layer can be sealed. The viscosity of the sealing agent can be adjusted by changing, for example, the amount of solvent to be mixed with the sealing agent (the resin concentration in the sealing agent). The viscosity of the sealing agent can also be adjusted using the temperature of the sealing agent at the time of application.

In the membrane electrode assembly sheet 160, the porosity of each of the gas diffusion layers 14, 15 can be, for example, 70% to 80%. When the MPLs 16, 17 are disposed in the gas diffusion layers 14, 15, the porosity of each of the MPLs 16, 17 can be, for example, 30% to 40%. The porosity of the catalytic electrode layer (the anode 12 and the cathode 13) can be, for example, 10% to 30%. When the sealing agent is applied onto the gas diffusion layer in the membrane electrode assembly sheet 160, the viscosity of the sealing agent can be, for example, 10,000 mPa·s to 20,000 mPa·s.

In step S110, the reliability of the operation of sealing pores from the gas diffusion layer to the catalytic electrode layer may be increased by adjusting the pressure at the time of applying the sealing agent. For example, when the sealing agent is applied by screen printing as in the case of using the roll screen printing device illustrated in FIG. 7, the pushing pressure of the sealing agent can be adjusted using the speed or angle of the squeegee 72a of the printing device. Alternatively, when a die coater is used, or when the membrane electrode assembly sheet 160 is disposed in a mold, and the sealing agent is squeezed into the mold to form the sealing agent applying region 124, the reliability of the operation of sealing pores may be increased by adjusting the injection pressure of the sealing agent. In such a case, the injection pressure of the sealing agent can be, for example, 0.2 MPa to 0.5 MPa.

The sealing agent applied in step S110 is cured to form a sealing portion 125 from the sealing agent applying region 124 (step S120). The sealing agent can be cured by, for example, pressing with heat in the same manner as in the first embodiment. After step S120, the membrane electrode assembly sheet 160 is cut (step S130), and a stack member 164 is acquired.

The stack member 164 of the second embodiment is an example of the MEGA 18. Thus, step S140 in FIG. 4 in which the gas diffusion layer is stacked is not performed in the second embodiment. After step S130, the stack member 164 and the resin frame 20 are joined together (step S150). The sealing portion 125 that is disposed in the outer peripheral portion of each of the cathode 13 and the gas diffusion layer 15 is exposed on the outer surface of the stack member 164. Thus, the adhesive portion 22 is bonded to the sealing portion 125 in the exposed part of the sealing portion 125, that is, on both the surface of the sealing portion 125 perpendicular to the stack direction and the surface of the sealing portion 125 parallel to the stack direction (the surface of the sealing portion 125 in its thickness direction). Accordingly, the outer peripheral portion of the stack member 164 (MEGA 18) is airtightly sealed between the stack member 164 and the resin frame 20. After step S150, the fuel cell is assembled using the MEGA 18 to which the resin frame 20 is joined (step S160), and the fuel cell is completed.

In the fuel cell and the method of manufacturing the fuel cell of the second embodiment, the following effect can be achieved in addition to the same effect as the first embodiment. That is, since not only the catalytic electrode layer (cathode 13) but also the gas diffusion layer are sealed by the sealing portion 125, and the sealing portion 125 is bonded to the adhesive portion 22, the reliability of sealing in the outer peripheral portion of the MEGA 18 can be further increased.

Furthermore, since the membrane electrode assembly sheet 160 in which the gas diffusion layers are continuously stacked in advance on both surfaces of the MEA 10 is used, the gas diffusion layer 15 does not need to be individually stacked on the cathode 13 unlike the first embodiment. Thus, the manufacturing steps can be more simplified.

While the sealing agent is cured in step S120 by pressing with heat in the first and second embodiments, the sealing agent may be cured using a different method. For example, a special heating step may not be performed when a sealing agent that can be cured at room temperature is used. Particularly, in the second embodiment, when the sealing portion 125 is formed in the catalytic electrode layer and the gas diffusion layer, the thickness of the acquired sealing portion 125 can be further decreased by applying pressure to the sealing agent applying region 124 at the time of curing (refer to S120 in FIG. 8). When the thickness of the sealing portion 125 is decreased in order to increase the rigidity of the sealing portion 125 in the gas diffusion layer included in the MEGA 18, the surface pressure in the region surrounded by the sealing portion 125 on the inner side of the sealing portion 125, that is, the surface pressure in an electric power generation region, can be more easily maintained when the fuel cell is assembled by stacking each member including the MEGA 18.

C. Third Embodiment

Figure 9:
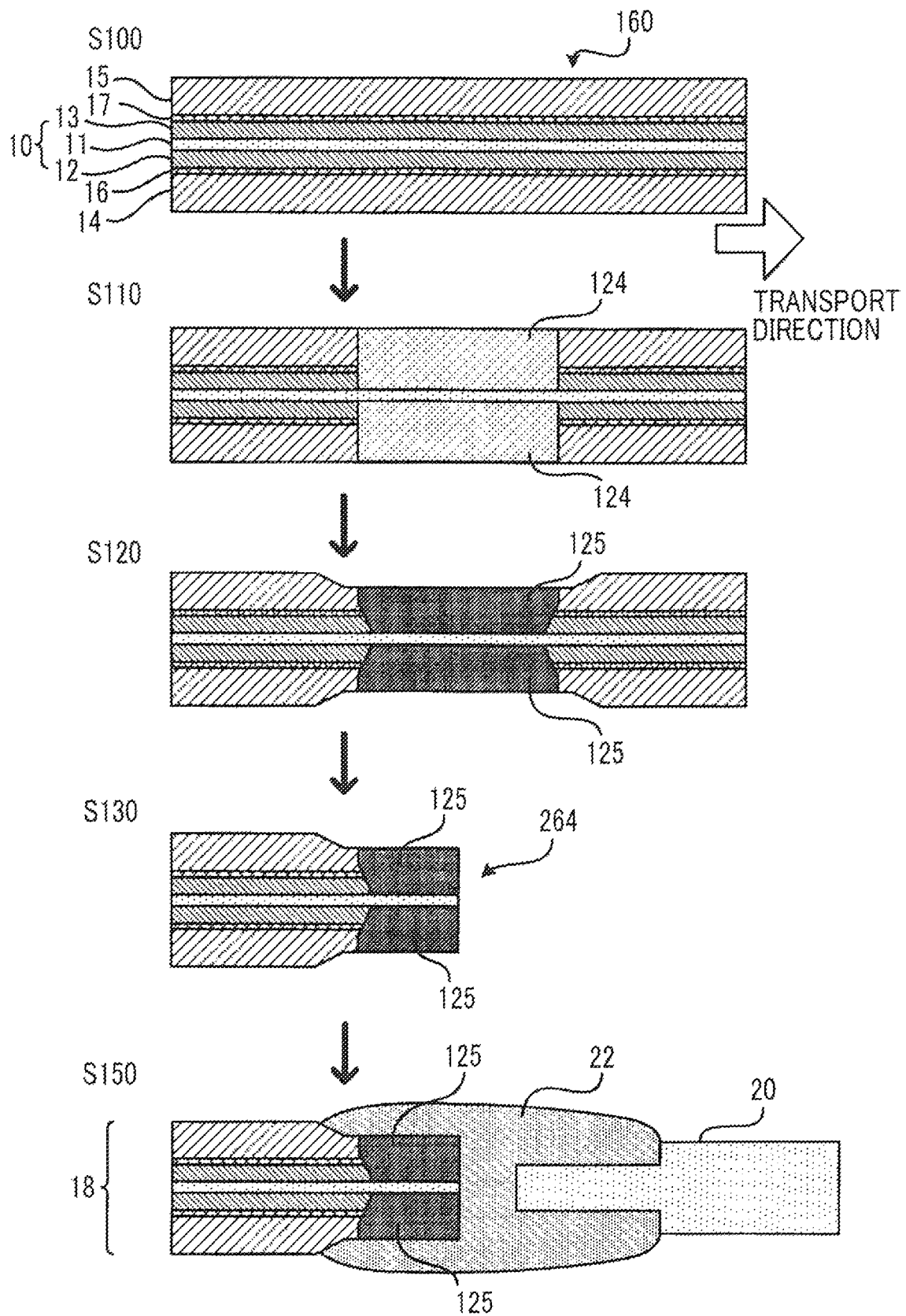
FIG. 9 is a schematic sectional view illustrating a state of each step in the middle of manufacturing a fuel cell.
Figure 10:
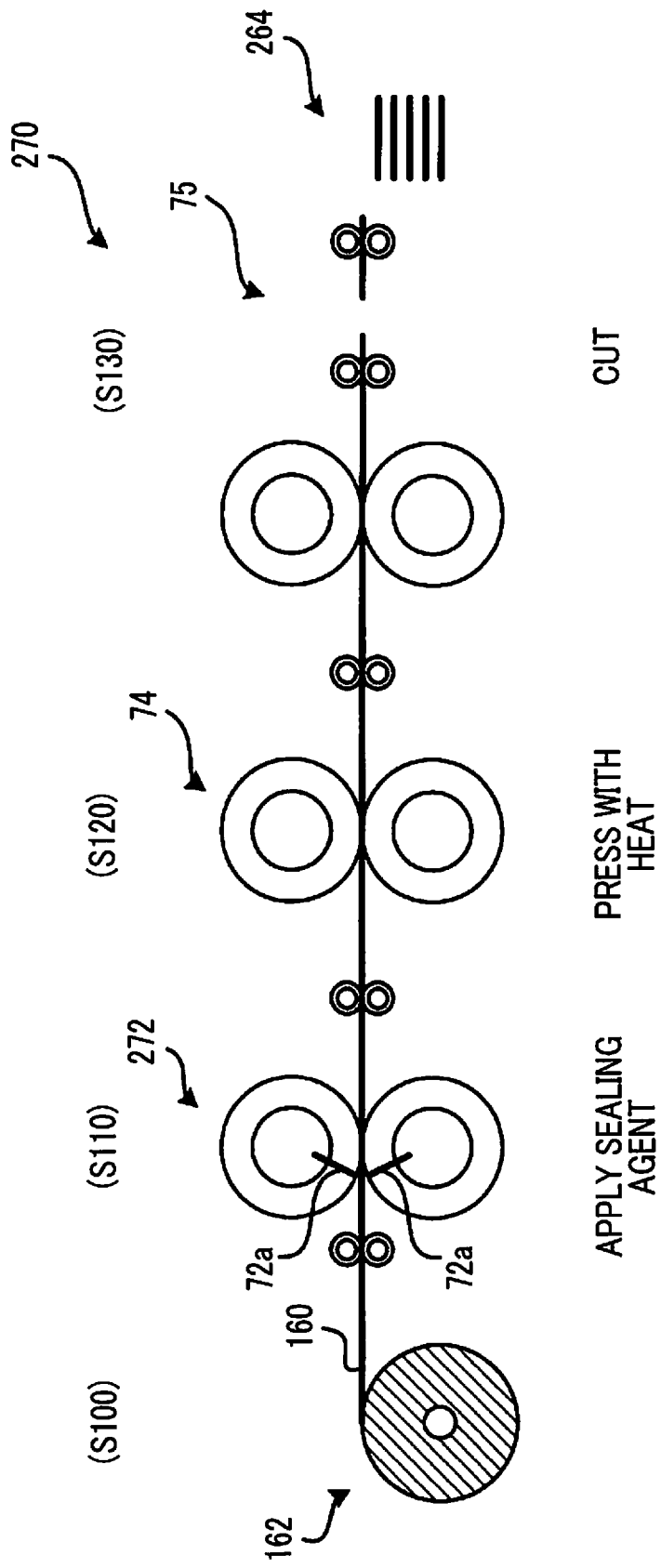
FIG. 10 is an explanatory diagram schematically illustrating a configuration of a manufacturing device.

FIG. 9 is a schematic sectional view illustrating the state of each step in the middle of manufacturing a fuel cell of a third embodiment in the same manner as FIG. 5. FIG. 10 is an explanatory diagram schematically illustrating a configuration of a manufacturing device 270 that executes step S100 to step S130 of manufacturing steps. The manufacturing device 270 includes a sealing agent applying unit 272, the curing unit 74, and the cutting unit 75. As illustrated in FIG. 10, the manufacturing device 270 executes various processes in its units while continuously transporting a band-shaped layer including the MEA 10 in a roll-to-roll manner. The fuel cell of the third embodiment has the same configuration as the fuel cell of the first embodiment. Thus, common parts in the first embodiment and the second embodiment will be designated by the same reference signs and will not be described in detail. In a method of manufacturing the fuel cell of the third embodiment, common steps in the first embodiment and the second embodiment will be designated by the same step numbers and will not be described in detail.

When the fuel cell of the third embodiment is manufactured, first, the same membrane electrode assembly sheet 160 as in the second embodiment is prepared as a membrane electrode assembly sheet roll 162 (step S100). In the sealing agent applying unit 272, the sealing agent is applied onto each of a pair of gas diffusion layers included in the membrane electrode assembly sheet 160 (step S110). The arrangement of the region where the sealing agent is applied is the same as the arrangement of the region in the first embodiment illustrated in FIG. 6. The sealing agent applying regions 124 that are formed by applying the sealing agent to the surfaces are disposed at positions matching in the stack direction (refer to S110 in FIG. 9). Accordingly, pores in the cathode 13 and the gas diffusion layer 15, and pores in the anode 12 and the gas diffusion layer 14 are sealed using the sealing agent in the sealing agent applying regions 124. That is, the cathode 13 and the gas diffusion layer 15, and the anode 12 and the gas diffusion layer 14 in the third embodiment are examples of the "porous layer" in "SUMMARY". The application of the sealing agent onto the gas diffusion layer can be performed in the same manner as the second embodiment.

The sealing agent applied in step S110 is cured to form the sealing portions 125 from the sealing agent applying region 124 (step S120). The sealing agent can be cured by, for example, pressing with heat as in the first embodiment. After step S120, the membrane electrode assembly sheet 160 is cut in the sealing portions 125 (step S130), and a stack member 264 is acquired.

Steps after step S130 are performed in the same manner as the second embodiment. The sealing portions 125 are exposed on both outer surfaces of the stack member 264 of the third embodiment on the anode side and the cathode side. Thus, in step S150, the adhesive portion 22 is bonded to the sealing portions 125 in the exposed parts of the sealing portions 125 on both sides. Accordingly, the outer peripheral portion of the stack member 264 (MEGA 18) is airtightly sealed between the stack member 264 and the resin frame 20.

In the fuel cell and the method of manufacturing the fuel cell of the third embodiment, the following effect can be achieved in addition to the same effect as the first embodiment and the second embodiment. That is, since the catalytic electrode layers and the gas diffusion layers are sealed by the sealing portions 125 on both surfaces of the MEGA 18, and the sealing portions 125 in the catalytic electrode layers and the gas diffusion layers on both sides are bonded to the adhesive portion 22, the reliability of sealing in the outer peripheral portion of the MEGA 18 can be further increased.

D. Fourth Embodiment

Figure 11:
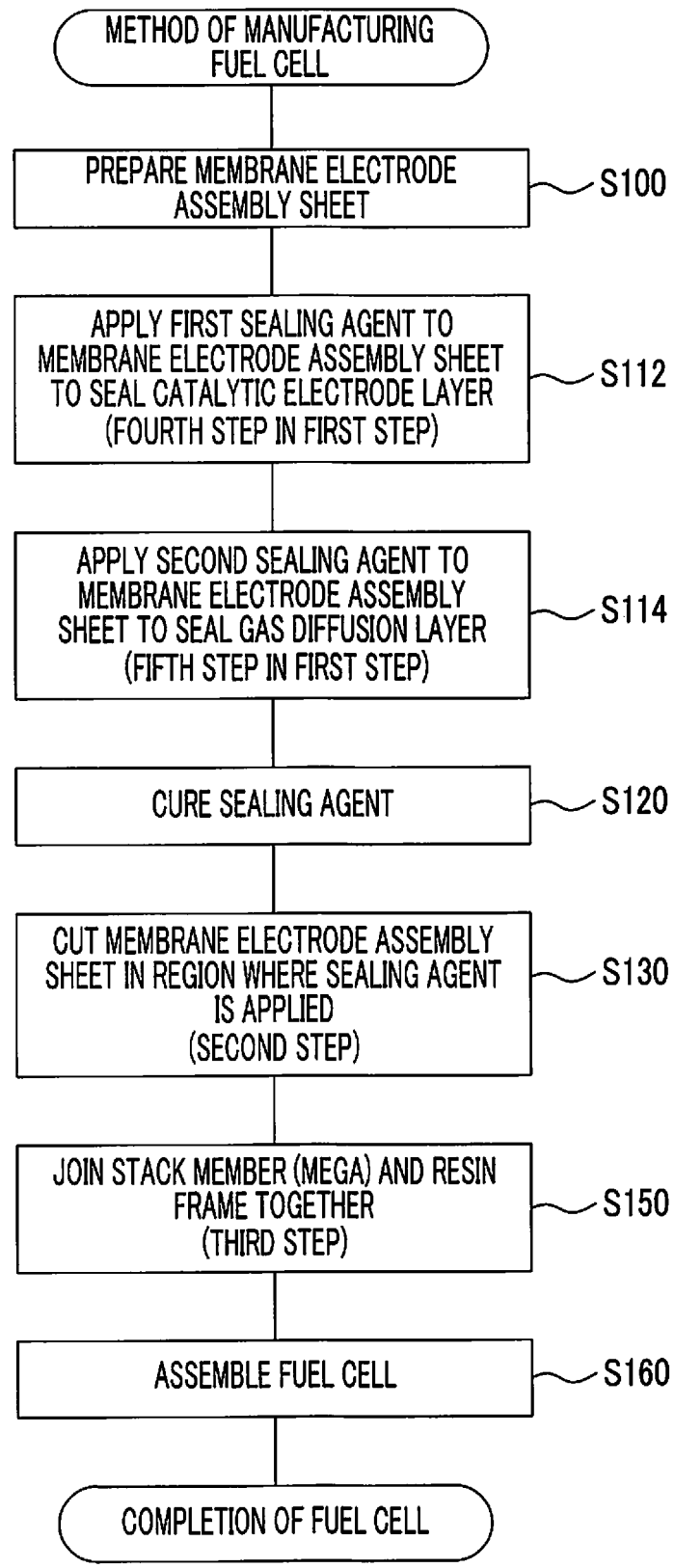
FIG. 11 is a flowchart illustrating a method of manufacturing a fuel cell.
Figure 12:
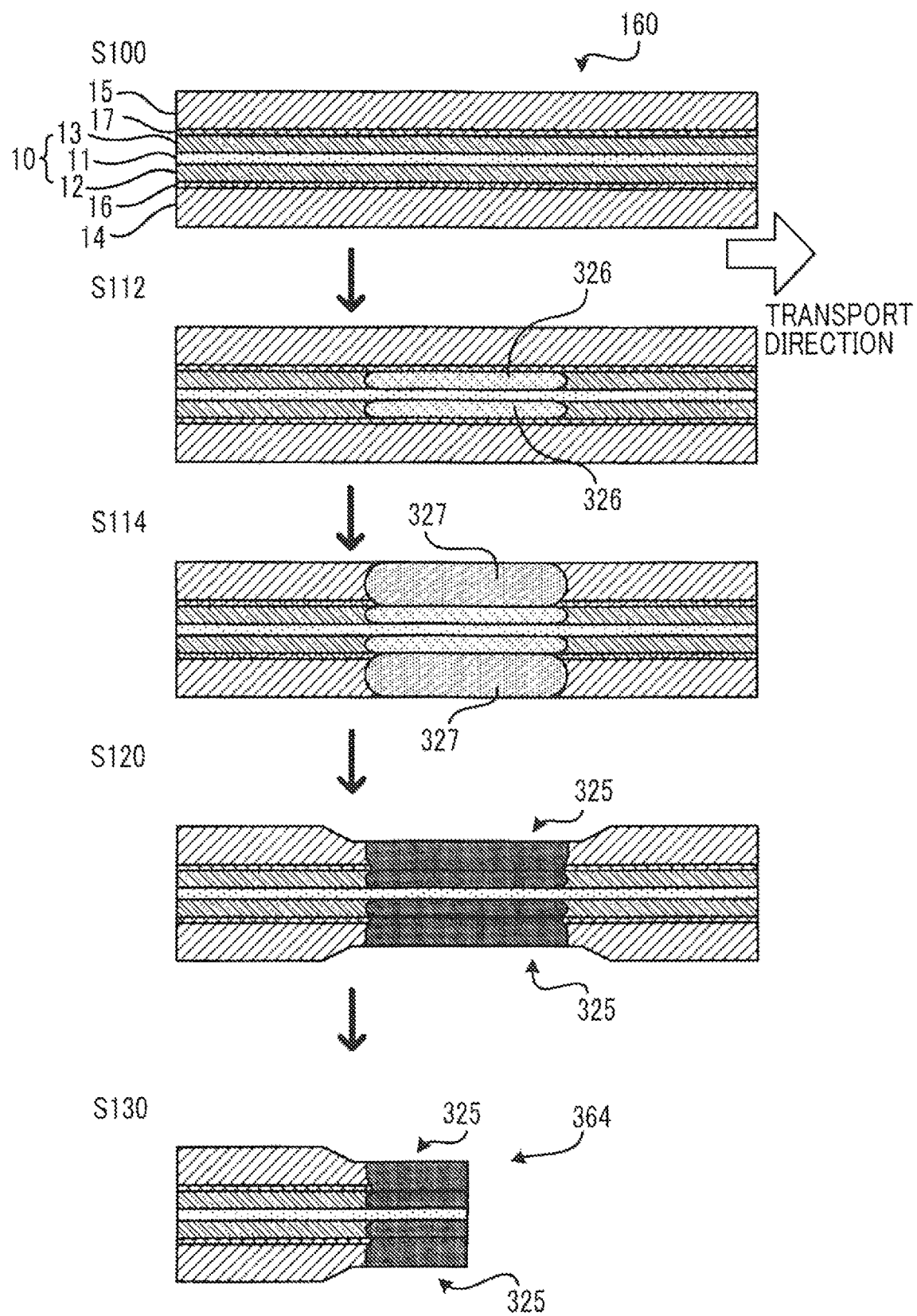
FIG. 12 is a schematic sectional view illustrating a state of each step in the middle of manufacturing the fuel cell.
Figure 13:
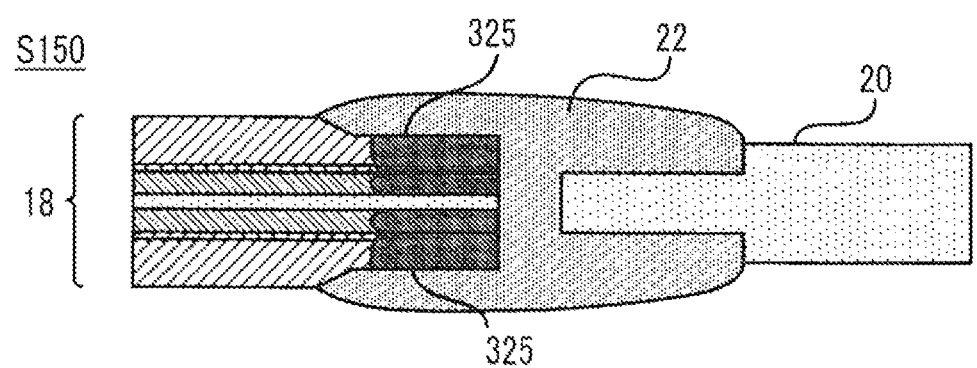
FIG. 13 is a schematic sectional view illustrating a state in the middle of manufacturing the fuel cell.
Figure 14:
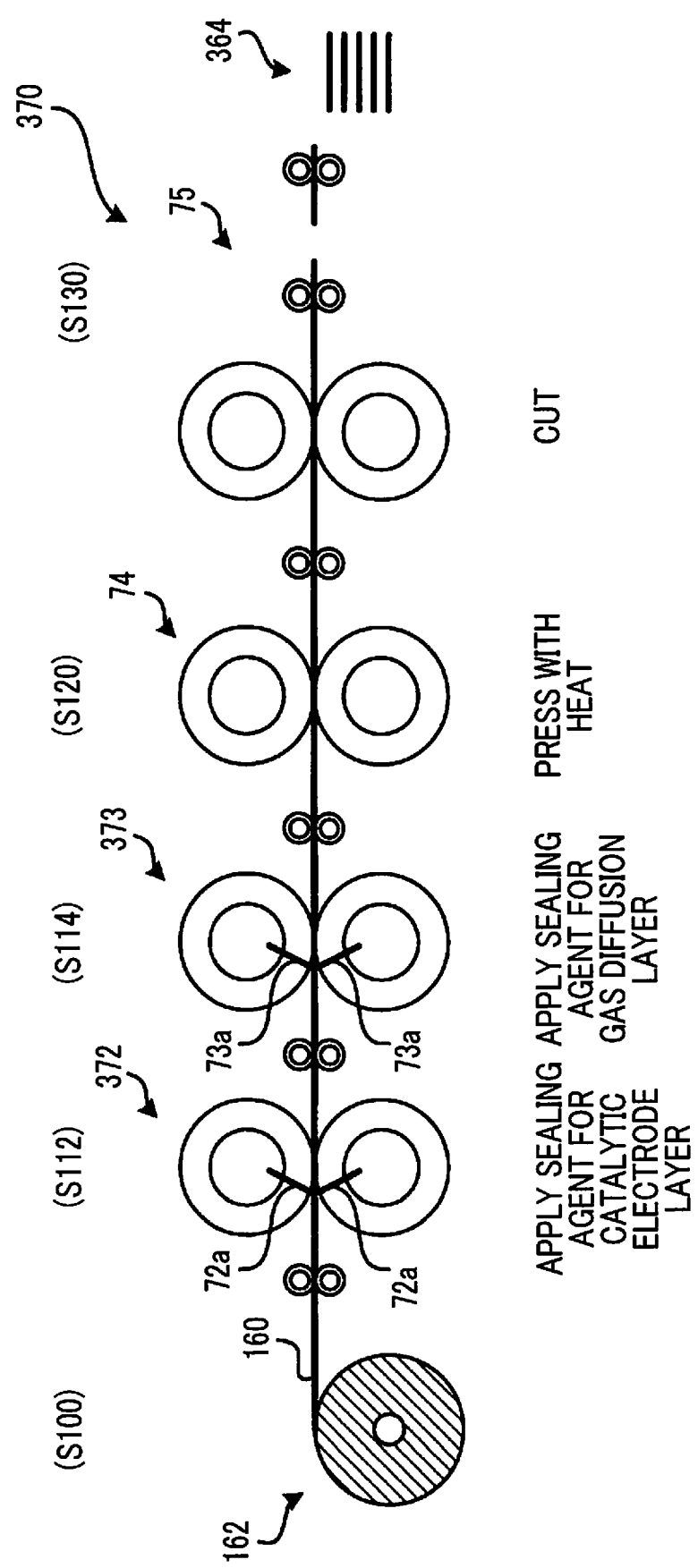
FIG. 14 is an explanatory diagram schematically illustrating a configuration of a manufacturing device.

FIG. 11 is a flowchart illustrating a method of manufacturing a fuel cell of a fourth embodiment. FIG. 12 and FIG. 13 are schematic sectional views illustrating the state of each step in the middle of manufacturing in the same manner as FIG. 5 when the fuel cell is manufactured using the method illustrated in FIG. 11. FIG. 14 is an explanatory diagram schematically illustrating a configuration of a manufacturing device 370 that executes step S100 to step S130 illustrated in FIG. 11. The manufacturing device 370 includes sealing agent applying units 372, 373, the curing unit 74, and the cutting unit 75. As illustrated in FIG. 14, the manufacturing device 370 executes various processes in its units while continuously transporting a band-shaped layer including the MEA 10 in a roll-to-roll manner. The fuel cell of the fourth embodiment has the same configuration as the fuel cell of the first embodiment. Thus, common parts in the first embodiment and the second embodiment will be designated by the same reference signs and will not be described in detail. In the method of manufacturing the fuel cell of the fourth embodiment, common steps in the first embodiment will be designated by the same step numbers and will not be described in detail.

In the fourth embodiment, as the sealing agent, a first sealing agent and a second sealing agent are used. When the fuel cell of the fourth embodiment is manufactured, first, the same membrane electrode assembly sheet 160 as the second embodiment is prepared (step S100). In the sealing agent applying unit 372, the first sealing agent is applied onto each of a pair of gas diffusion layers included in the membrane electrode assembly sheet 160 (step S112). The applied first sealing agent permeates to the catalytic electrode layers from the gas diffusion layers. Accordingly, sealing agent applying regions 326 are formed in the anode 12 and the cathode 13, and the pores of the anode 12 and the cathode 13 are sealed by the first sealing agent (refer to S112 in FIG. 12). Then, in the sealing agent applying unit 373, the second sealing agent is applied onto each of the gas diffusion layers included in the membrane electrode assembly sheet 160 in the region where the first sealing agent is applied in step S112 (step S114). Accordingly, sealing agent applying regions 327 are formed in the gas diffusion layers 14, 15, and the pores of the gas diffusion layers 14, 15 are sealed by the second sealing agent (refer to S114 in FIG. 12). That is, the cathode 13 and the gas diffusion layer 15, and the anode 12 and the gas diffusion layer 14 in the fourth embodiment are examples of the "porous layer" in "SUMMARY". Step S112 is referred to as a fourth step in the first step, and step S114 is referred to as a fifth step in the first step.

The viscosity of the first sealing agent used in step S112 is adjusted such that the first sealing agent permeates to the anode 12 and the cathode 13 to seal the pores of the anode 12 and the cathode 13 when the first sealing agent is applied onto the gas diffusion layers 14, 15. The viscosity of the second sealing agent used in step S114 is adjusted to be higher than that of the first sealing agent. As the first and second sealing agents, the same sealing agent as in the first embodiment can be used, and the sealing agent can be applied using the same method as in the first embodiment. Different types of sealing agents may be used as the first sealing agent and the second sealing agent, but it is desirable to use the same type of sealing agent (sealing agents including resins from the same family) as the first sealing agent and the second sealing agent. For example, it is desirable that both of the first and second sealing agents include PIB or silicone rubber. The viscosity of each of the first and second sealing agents can be adjusted by changing, for example, the amount of solvent to be mixed with the sealing agent (the resin concentration in the sealing agent). The viscosity of the sealing agent can also be adjusted using the temperature of the sealing agent at the time of application.

In FIG. 14, in the sealing agent applying units 372, 373, the sealing agent is applied using a roll screen printing device that includes a roll-shaped screen and squeegees 72a, 73a and performs printing using the sealing agent. However, the method of applying the sealing agent is not particularly limited as long as each sealing portion 325 having a desired shape can be formed by the method. In step S112 and step S114, the pressure at the time of applying the sealing agent may be adjusted. Accordingly, it is possible to increase the reliability of the operation of sealing the pores of the anode 12 and the cathode 13 using the first sealing agent through the gas diffusion layers 14, 15, and the operation of sealing the pores of the gas diffusion layers 14, 15 using the second sealing agent having a higher viscosity than the first sealing agent. For example, when the sealing agent is applied by screen printing as in the case of using the roll screen printing device illustrated in FIG. 14, the pushing pressure of the sealing agent can be adjusted using the speed or angle of the squeegees 72a, 73a of the printing device. Alternatively, when a die coater is used, or when the membrane electrode assembly sheet 160 is disposed in a mold, and the sealing agent is squeezed into the mold to form the sealing agent applying region 124, the reliability of the operation of sealing pores may be increased by adjusting the injection pressure of the sealing agent.

The first and second sealing agents applied in step S112 and step S114 are cured to form the sealing portions 325 from the sealing agent applying regions 326, 327 (step S120). The sealing agent can be cured by, for example, pressing with heat as in the first embodiment. After step S120, the membrane electrode assembly sheet 160 is cut (step S130), and a stack member 364 is acquired (refer to S130 in FIG. 12 and FIG. 14).

Steps after step S130 are performed in the same manner as the second embodiment. The sealing portions 325 are exposed on both outer surfaces of the stack member 364 of the fourth embodiment on the anode side and the cathode side. Thus, in step S150, the adhesive portion 22 is bonded to the sealing portions 325 in the exposed parts of the sealing portions 325 on both sides (refer to FIG. 13). Accordingly, the outer peripheral portion of the stack member 364 (MEGA 18) is airtightly sealed between the stack member 364 and the resin frame 20.

In the fuel cell and the method of manufacturing the fuel cell of the fourth embodiment, the following effect can be achieved in addition to the same effect as the first to third embodiments. That is, since the viscosity of the first sealing agent is set to be lower than the viscosity of the second sealing agent, it is possible to increase the reliability of the operation of sealing the pores of the catalytic electrode layers by applying the first sealing agent onto the gas diffusion layers 14, 15. Furthermore, since the viscosity of the second sealing agent is set to be higher than the viscosity of the first sealing agent, the porosity of each catalytic electrode layer is higher than that of a general catalytic electrode layer. In addition, when the second sealing agent is applied to each gas diffusion layer of which the diameter of each pore is larger than that of each catalytic electrode layer, it is possible to suppress spreading of the second sealing agent in each gas diffusion layer beyond a desired range. Thus, it is possible to suppress a situation where supply of the reactant gases to the catalytic electrode layers is impeded by the sealing portions at the time of generating electric power in the fuel cell.

E. Fifth Embodiment

Figure 15:
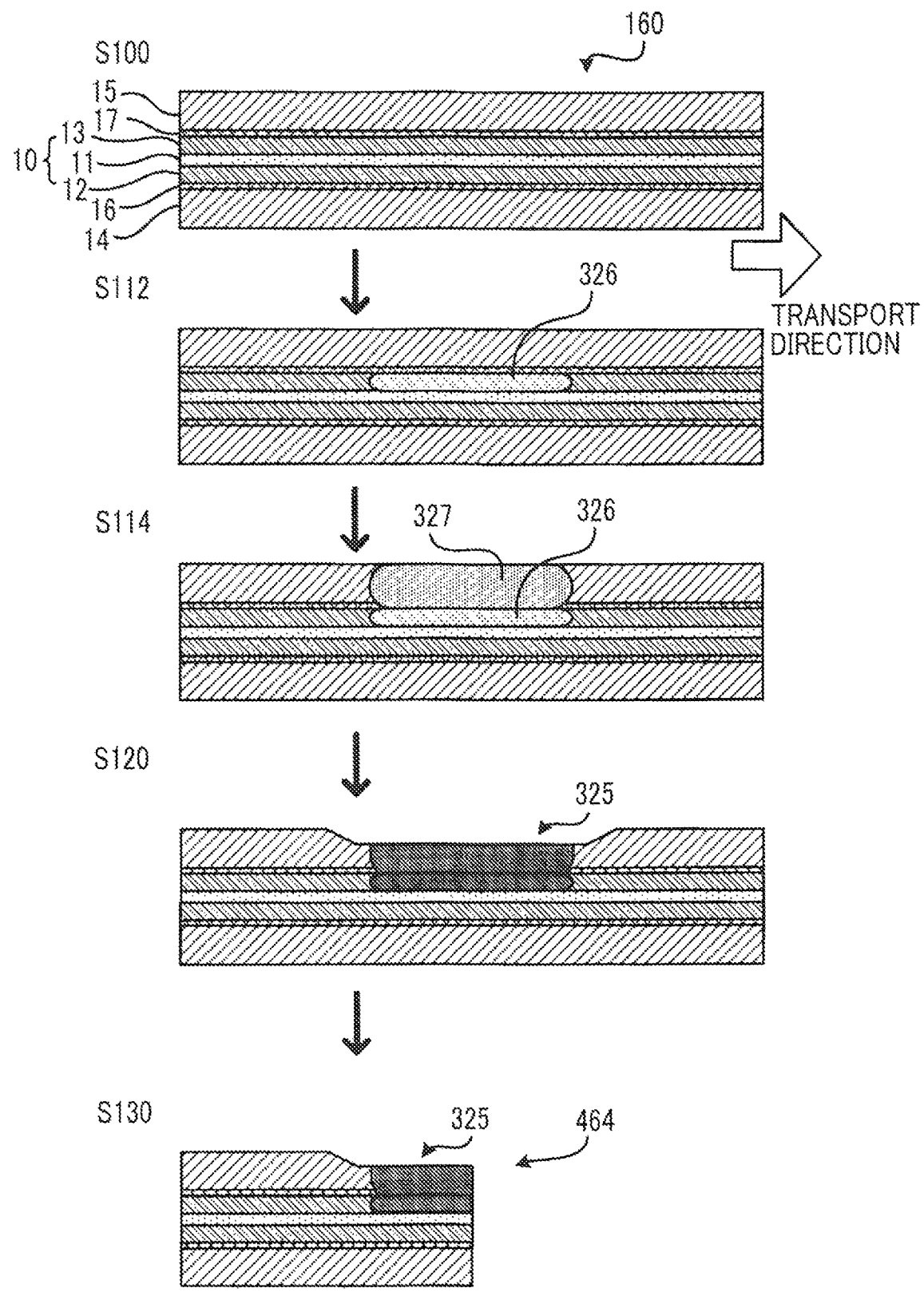
FIG. 15 is a schematic sectional view illustrating a state of each step in the middle of manufacturing a fuel cell.
Figure 16:
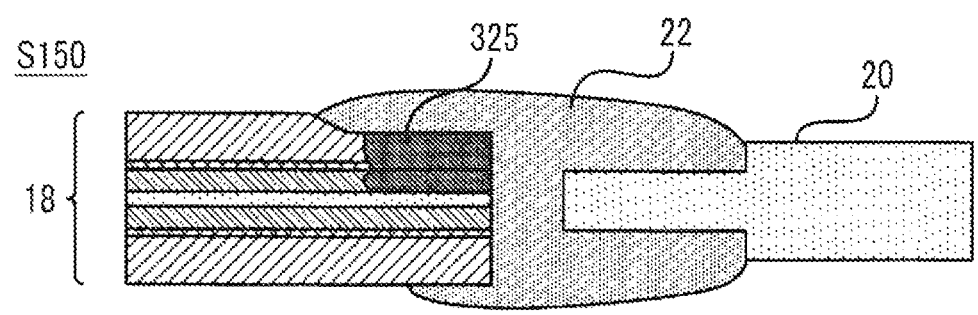
FIG. 16 is a schematic sectional view illustrating a state in the middle of manufacturing the fuel cell.

FIG. 15 and FIG. 16 are schematic sectional views illustrating the state of each step in the middle of manufacturing a fuel cell of a fifth embodiment in the same manner as FIG. 5. The fuel cell of the fifth embodiment has the same configuration as the fuel cell of the fourth embodiment except that the sealing portion 325 is formed in one catalytic electrode layer and one gas diffusion layer (in FIG. 15 and FIG. 16, the cathode 13 and the gas diffusion layer 15). In the fifth embodiment, a stack member 464 in which the sealing portion 325 is formed in the cathode 13 and the gas diffusion layer 15 is produced (refer to S130 in FIG. 15), and the stack member 464 and the resin frame 20 are joined together through the sealing portion 325 and the adhesive portion 22 (refer to FIG. 16). Accordingly, even when the sealing portion 325 is disposed in the catalytic electrode layer and the gas diffusion layer on one surface side of the electrolyte membrane 11, the same effect as the first to fourth embodiments can be achieved.

F. Sixth Embodiment

Figure 17:
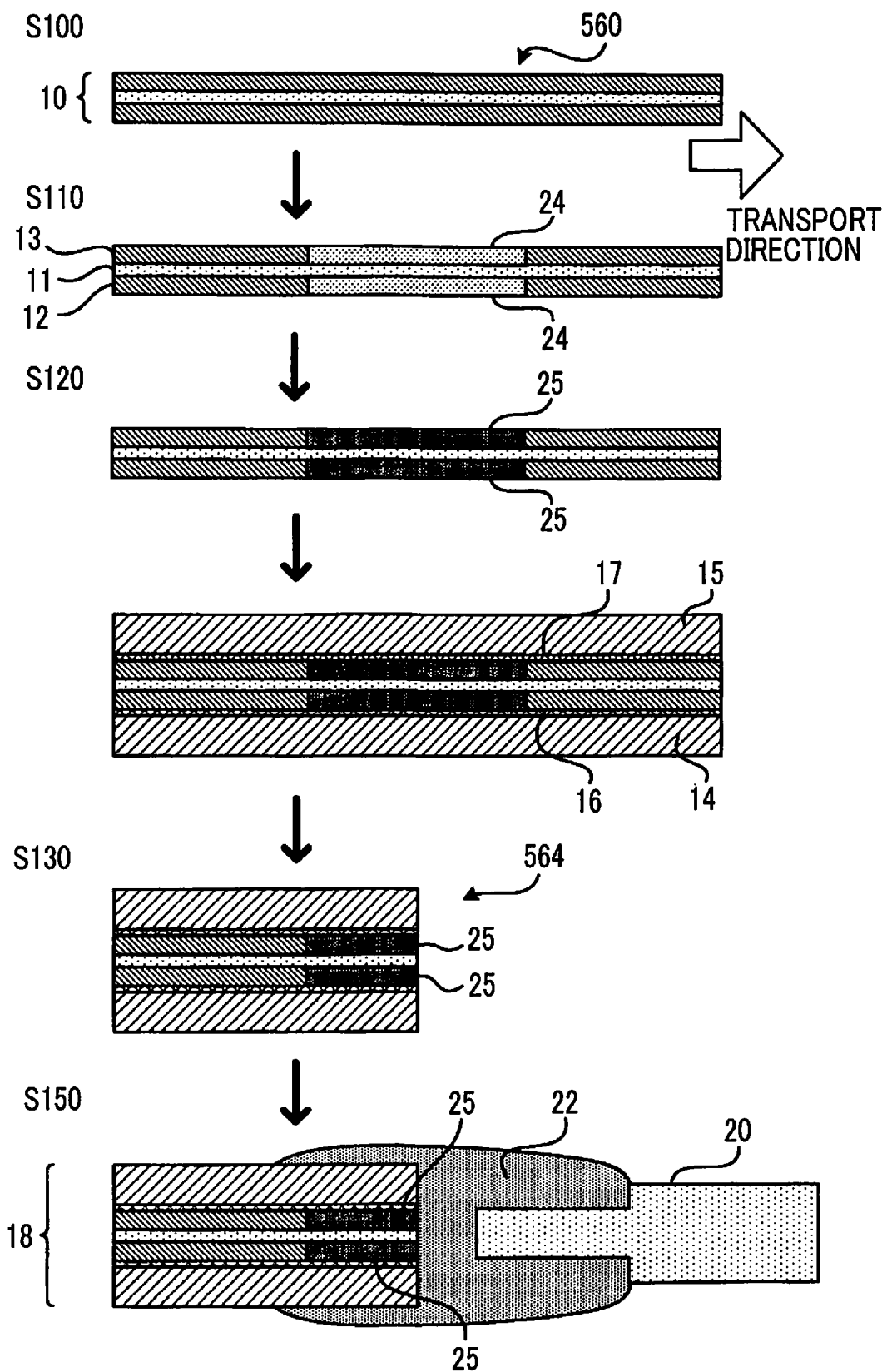
FIG. 17 is a schematic sectional view illustrating a state of each step in the middle of manufacturing a fuel cell.

FIG. 17 is a schematic sectional view illustrating the state of each step in the middle of manufacturing a fuel cell of a sixth embodiment in the same manner as FIG. 5. The fuel cell of the sixth embodiment has the same configuration as the fuel cell of the first to third embodiments. Thus, common parts in the first to third embodiments will be designated by the same reference signs and will not be described in detail. In a method of manufacturing the fuel cell of the sixth embodiment, common steps in the first to third embodiments will be designated by the same step numbers and will not be described in detail.

When the fuel cell of the sixth embodiment is manufactured, first, a membrane electrode assembly sheet 560 is prepared instead of the membrane electrode assembly sheet 60 or 160 in the first to third embodiments (step S100). The membrane electrode assembly sheet 560 of the sixth embodiment has the structure of the MEA 10 and does not include a gas diffusion layer (refer to S100 in FIG. 17).

The sealing agent is applied to each of a pair of catalytic electrode layers included in the membrane electrode assembly sheet 560 (step S110). The arrangement of the region where the sealing agent is applied is the same as the arrangement of the region in the first embodiment illustrated in FIG. 6. The sealing agent applying regions 24 that are formed by applying the sealing agent to the surfaces are disposed at positions matching in the stack direction. Accordingly, pores in the cathode 13 and the anode 12 are sealed using the sealing agent in each sealing agent applying region 24. That is, the cathode 13 and the anode 12 in the sixth embodiment are examples of the "porous layer" in "SUMMARY". As the sealing agent, the same sealing agent as in the first embodiment can be used, and the sealing agent can be applied using the same method as in the first embodiment.

The sealing agent applied in step S110 is cured to form the sealing portions 25 from the sealing agent applying regions 24 (step S120). The sealing agent can be cured by, for example, pressing with heat as in the first embodiment.

In the sixth embodiment, after step S120, porous layers of the gas diffusion layers 14, 15 are stacked on the surfaces of the membrane electrode assembly sheet 560, respectively (refer to the fourth step in FIG. 17). Then, the membrane electrode assembly sheet 560 in which the gas diffusion layers 14, 15 are stacked is cut (step S130), and a stack member 564 is acquired (refer to S130 in FIG. 17). After step S130, the stack member 564 and the resin frame 20 are joined together (step S150). In the stack member 564, the sealing portions 25 disposed in the outer peripheral portions of the anode 12 and the cathode 13 are exposed on the cut section of the stack member 564. Thus, the adhesive portion 22 is bonded to the sealing portions 25 in the exposed parts of the sealing portions 25, that is, the surface of each sealing portion 25 parallel to the stack direction (the surface of each sealing portion 25 in its thickness direction). Accordingly, the outer peripheral portion of the stack member 564 (MEGA 18) is airtightly sealed between the stack member 564 and the resin frame 20. After step S150, the fuel cell is assembled using the MEGA 18 to which the resin frame 20 is joined (step S160), and the fuel cell is completed.

In the fuel cell and the method of manufacturing the fuel cell of the sixth embodiment, the reliability of gas sealing in the outer peripheral portion of the MEGA 18 can be maintained, and damage to the electrolyte membrane 11 when the fuel cell is used can be suppressed as in the first embodiment. Since the gas diffusion layers 14, 15 are stacked in a roll-to-roll manner before the cutting in step S130, the operation of stacking the gas diffusion layers on the MEA 10 does not need to be performed for each MEA 10, and the operation of stacking the gas diffusion layers can be simplified. The gas sealability can be increased by bonding the sealing portions 25 and the adhesive portion 22 to each other on both surface sides of the electrolyte membrane 11.

G. Seventh Embodiment

Figure 18:
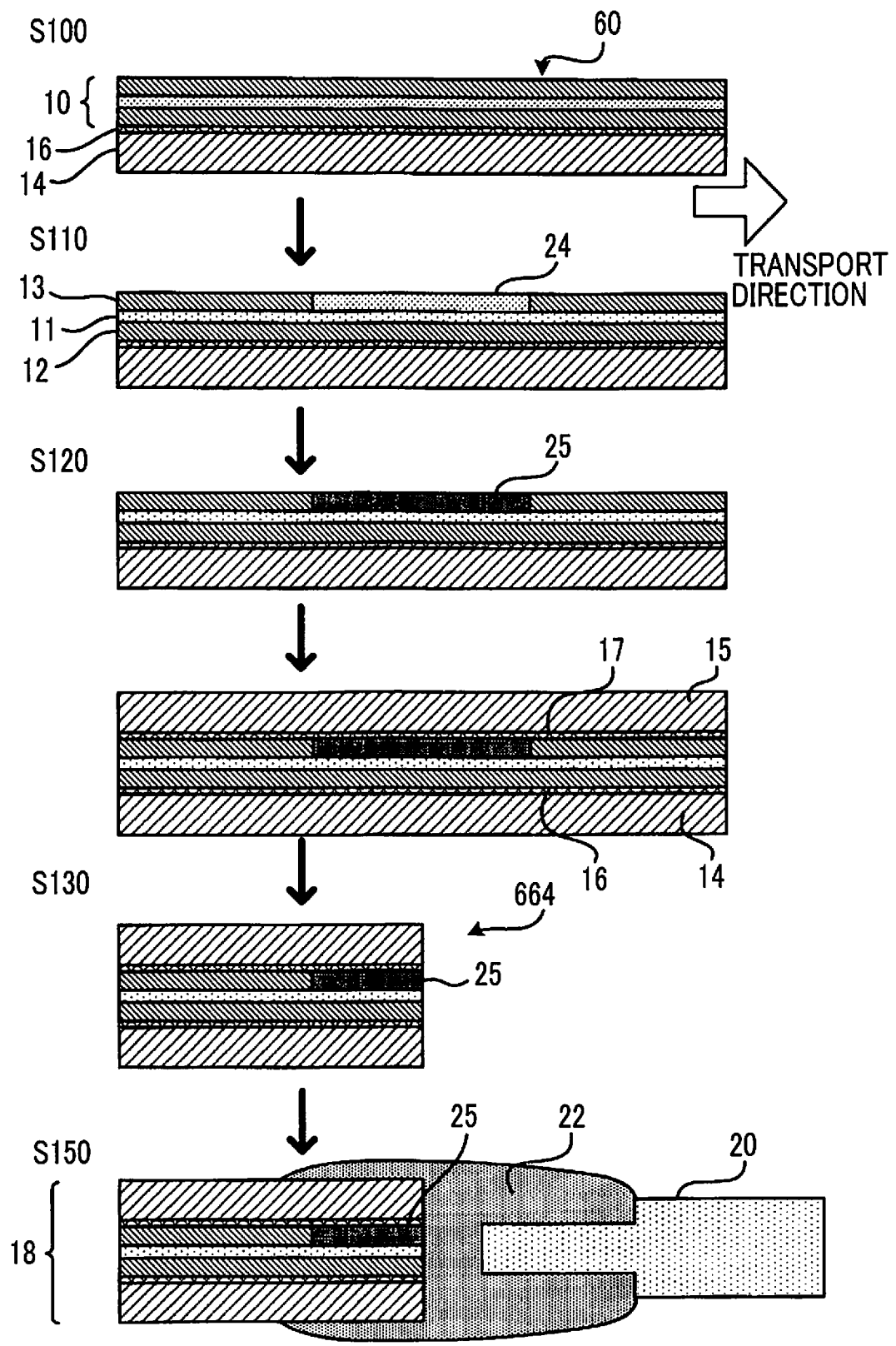
FIG. 18 is a schematic sectional view illustrating a state of each step in the middle of manufacturing a fuel cell.
Figure 19:
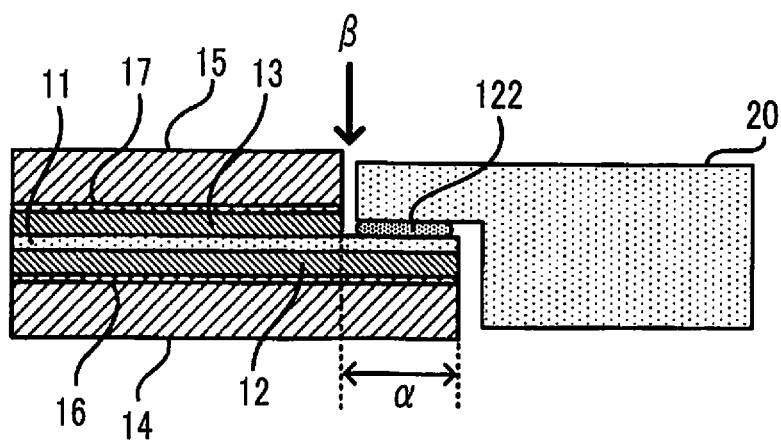
FIG. 19 is a schematic sectional view illustrating a sealing structure of a fuel cell in the related art.

FIG. 18 is a schematic sectional view illustrating the state of each step in the middle of manufacturing a fuel cell of a seventh embodiment in the same manner as FIG. 5. The fuel cell of the seventh embodiment has the same configuration as the first embodiment except that cutting in step S130 is performed after forming the sealing portion 25 in one catalytic electrode layer (in FIG. 18, the cathode 13) and then, stacking the gas diffusion layer on the one catalytic electrode layer. That is, in the seventh embodiment, a stack member 664 is produced by performing cutting in step S130 after the band-shaped gas diffusion layer 15 is stacked on the membrane electrode assembly sheet 60 in which the sealing portion 25 is formed, and the stack member 664 and the resin frame 20 are bonded to each other using the adhesive.

Even with such a configuration, the reliability of gas sealing in the outer peripheral portion of the MEGA 18 can be maintained, and damage to the electrolyte membrane 11 when the fuel cell is used can be suppressed as in the first embodiment. In the seventh embodiment, since the gas diffusion layer 15 is stacked in a roll-to-roll manner before the cutting in step S130, the operation of stacking the gas diffusion layer 15 on the MEA 10 does not need to be performed for each MEA 10, and the operation of stacking the gas diffusion layer can be simplified.

H. Other Embodiments

While the sealing portion in each embodiment is disposed on the entire outer periphery of the MEA 10 or the MEGA 18, that is, all of the four sides of the outer periphery of the MEA 10 or the MEGA 18, the embodiment of the disclosure may have a different configuration. Sealing may be performed in a part of the outer periphery of the MEA 10 or the MEGA 18 using the sealing portion that seals the porous layer, and the gas sealability may be maintained using a different method in the other part. When the sealing portion that seals the porous layer is included in at least a part of the outer periphery of the MEA 10 or the MEGA 18, and the sealing portion is bonded to the resin frame in the part, the effect described above can be achieved in the part where the sealing portion is disposed.

While the fuel cell has a gas diffusion layer in each embodiment, the embodiment of the disclosure may have a different configuration. For example, a case in which a porous member that covers the entire region contributing electric power generation in the MEA 10 is disposed in contact with both of the MEA 10 and the gas separators 40, 50, and the porous member forms channels in which the reactant gases flow in the single fuel cell is considered. In such a case, the gas diffusion layers 14, 15 may not be provided. When such a configuration is employed, the sealing portion may be disposed in the outer peripheral portion of the catalytic electrode layer which is the porous layer, and the sealing portion and the resin frame may be bonded to each other using the adhesive.

The disclosure is not limited to the embodiments and can be implemented as various configurations without departing from the gist thereof. For example, technical features of the embodiments corresponding to technical features in each aspect disclosed in SUMMARY can be appropriately substituted or combined with each other. When such technical features are described as being optional in the specification, those technical features may not be provided.

What is claimed is:

1. A method of manufacturing a fuel cell including a membrane electrode assembly in which catalytic electrode layers are respectively formed on both surfaces of an electrolyte membrane, and a resin frame joined to an outer peripheral portion of the membrane electrode assembly, the method comprising:

in a membrane electrode assembly sheet that is used for acquiring the membrane electrode assembly and includes the electrolyte membrane and the catalytic electrode layers, and in which a porous layer including at least the catalytic electrode layer is disposed on at least one surface of the electrolyte membrane, applying a sealing agent onto the porous layer in a region including a part to be formed into an outer periphery of the membrane electrode assembly to seal a pore of the porous layer in the region, the pore of the porous layer including at least pore of the catalytic electrode layer;

acquiring a stack member including the membrane electrode assembly by cutting the membrane electrode assembly sheet in the region; and joining a part of the porous layer in the stack member where the sealing agent is applied and the resin frame with an adhesive;

wherein:

the fuel cell further includes gas diffusion layers respectively stacked on the catalytic electrode layers in the membrane electrode assembly;

each of the membrane electrode assembly sheet and the stack member includes the gas diffusion layer stacked on the catalytic electrode layer as the porous layer; and when the pore of the porous layer is sealed by applying the sealing agent onto the porous layer in the region including the part to be formed into the outer periphery of the membrane electrode assembly, the pore of each of the catalytic electrode layer and the gas diffusion layer in the region is sealed by applying the sealing agent;

wherein when the pore of the porous layer is sealed by applying the sealing agent onto the porous layer in the region including the part to be formed into the outer periphery of the membrane electrode assembly, (i) a first sealing agent as the sealing agent to the membrane electrode assembly sheet is applied to seal the pore of the catalytic electrode layer in the region, and (ii) then, a second sealing agent having a higher viscosity than the first sealing agent as the sealing agent is applied onto the region where the first sealing agent is applied in the membrane electrode assembly sheet to seal the pore of the gas diffusion layer in the region.

2. The method according to claim 1, wherein when the pore of the porous layer is sealed by applying the sealing agent onto the porous layer in the region including the part to be formed into the outer periphery of the membrane electrode assembly, the sealing agent is applied to the porous layer using, as the membrane electrode assembly sheet, the membrane electrode assembly sheet in which the porous layer is disposed on both surfaces of the electrolyte membrane.

\* \* \* \* \*